US009586297B2

(12) United States Patent
Kozasa et al.

(10) Patent No.: US 9,586,297 B2
(45) Date of Patent: Mar. 7, 2017

(54) VEHICLE BODY COMPONENT MOUNTING SYSTEM

(71) Applicant: HONDA MOTOR CO., LTD., Tokyo (JP)

(72) Inventors: Nobuhiro Kozasa, Tochigi (JP); Katsuyoshi Tsutsumida, Tochigi (JP); Hidetoshi Takahashi, Tochigi (JP); Tomonori Iwasaki, Tochigi (JP); Katsutoshi Ebana, Tochigi (JP); Gentoku Fujii, Tochigi (JP); Yoshiki Asano, Tokyo (JP); Yoshio Nagasawa, Tokyo (JP); Kenji Tatsuda, Tokyo (JP); Hitoshi Suzukawa, Tokyo (JP); Koichi Sano, Tokyo (JP); Mamoru Miyamura, Tokyo (JP); Kunihiko Oba, Tokyo (JP); Yuji Kawamura, Tokyo (JP); Tadao Kurosawa, Tokyo (JP); Yohei Yamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 14/398,292

(22) PCT Filed: May 7, 2013

(86) PCT No.: PCT/JP2013/062839
§ 371 (c)(1),
(2) Date: Oct. 31, 2014

(87) PCT Pub. No.: WO2013/168706
PCT Pub. Date: Nov. 14, 2013

(65) Prior Publication Data
US 2015/0128397 A1    May 14, 2015

(30) Foreign Application Priority Data

May 11, 2012  (JP) .................................. 2012-109812
May 11, 2012  (JP) .................................. 2012-109821
(Continued)

(51) Int. Cl.
*B23P 21/00*   (2006.01)
*B62D 65/18*   (2006.01)
(Continued)

(52) U.S. Cl.
CPC ............ *B23P 21/004* (2013.01); *B62D 65/02* (2013.01); *B62D 65/18* (2013.01); *B65G 37/00* (2013.01);
(Continued)

(58) Field of Classification Search
CPC .... B23P 21/004; B23P 2700/50; B65G 37/00; B62D 65/18; B62D 65/02; Y10T 29/5191
See application file for complete search history.

(56) References Cited

U.S. PATENT DOCUMENTS 6,324,749 B1 * 12/2001  Katsuura ............... B23P 21/004
                                                            29/402.01
2005/0087426 A1   4/2005  Fenzl et al.
(Continued)

FOREIGN PATENT DOCUMENTS

DE    198 58 989 A1   6/2000
EP    0 718 179 A2    6/1996
(Continued)

OTHER PUBLICATIONS

International Search Report, Date of mailing: Jul. 23, 2013 (Jul. 23, 2013).

*Primary Examiner* — John C Hong
(74) *Attorney, Agent, or Firm* — Rankin, Hill & Clark LLP

(57) ABSTRACT

A vehicle body component mounting system is provided with, along a conveyance path for a vehicle body, an upstream component mounting work area using a cell production system, a central component mounting work area in which the vehicle body is conveyed by an overhead conveyor, and a downstream component mounting work area using the cell production system in this order. Components other than principal components are mounted to the vehicle body using the cell production system. The cell production system is adaptable by increasing the number of component boxes, and thus an increase in the length of the line is prevented. The increase in the length of the line is prevented by using a line production system as a base and also using the cell production system as a part thereof.

12 Claims, 30 Drawing Sheets

(30) Foreign Application Priority Data

Mar. 28, 2013 (JP) ................................. 2013-070057
Apr. 12, 2013 (JP) ................................. 2013-084287

(51) Int. Cl.
*B62D 65/02* (2006.01)
*B65G 37/00* (2006.01)

(52) U.S. Cl.
CPC ....... *B23P 2700/50* (2013.01); *Y10T 29/5191* (2015.01)

(56) References Cited

U.S. PATENT DOCUMENTS

2006/0157320 A1    7/2006   Spoeler
2009/0133989 A1*   5/2009   Takahashi ............. B23P 21/004
                                                            198/345.3

FOREIGN PATENT DOCUMENTS

| | | |
|---|---|---|
| JP | H02-7924 | 1/1990 |
| JP | 02-243234 | 9/1990 |
| JP | 2000-085649 | 3/2000 |
| JP | 2003-251575 | 9/2003 |
| JP | 2004-230485 | 8/2004 |
| JP | 2005-518952 | 6/2005 |
| JP | 2005-182388 | 7/2005 |
| JP | 2006-198764 | 8/2006 |
| JP | 2007-112605 | 5/2007 |
| JP | 2007-526861 | 9/2007 |
| JP | 2012-148357 | 8/2012 |
| WO | 2011/118246 | 9/2011 |
| WO | 2013/042511 | 3/2013 |

* cited by examiner

FIG.8
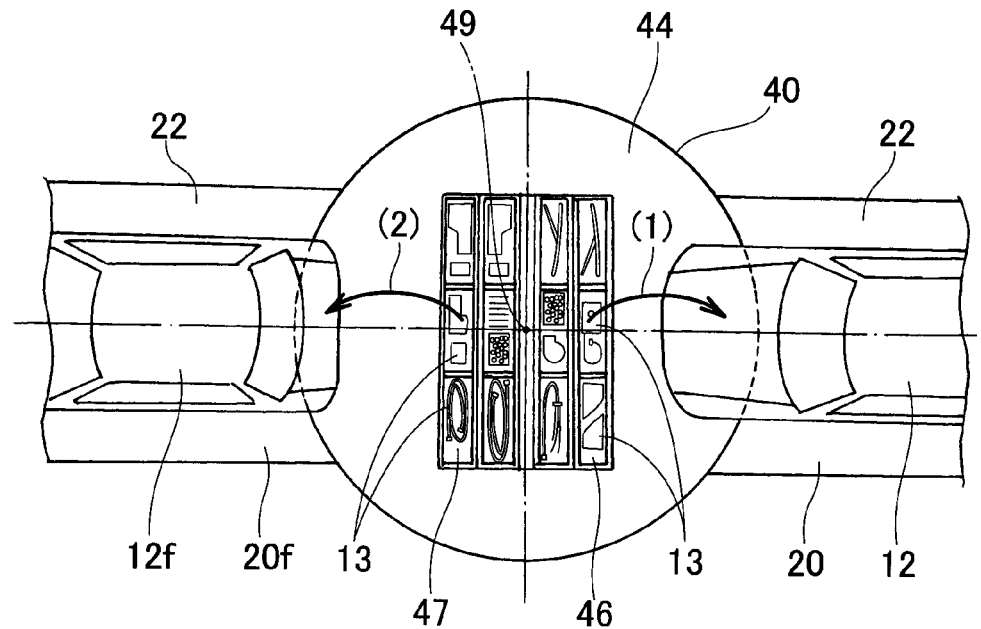
(a) DIRECT ADVANCE
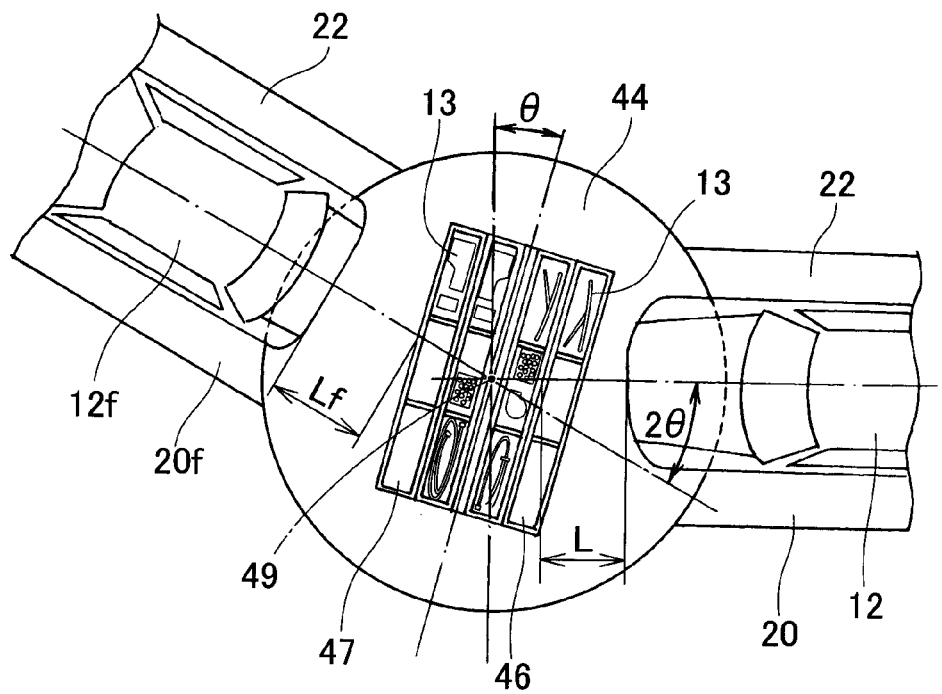
(b) TURN

FIG.23
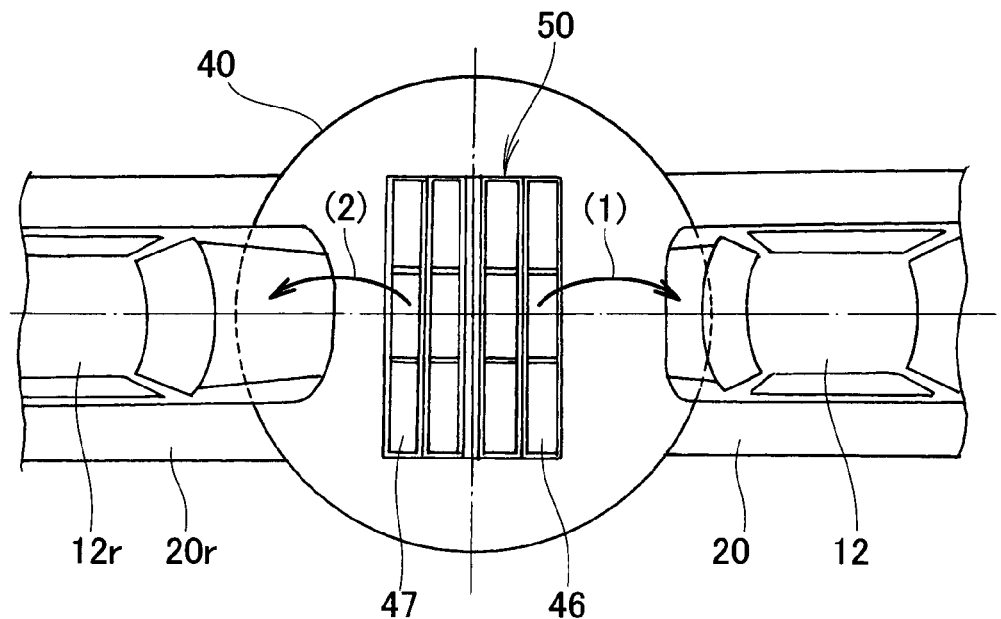
(a) DIRECT ADVANCE
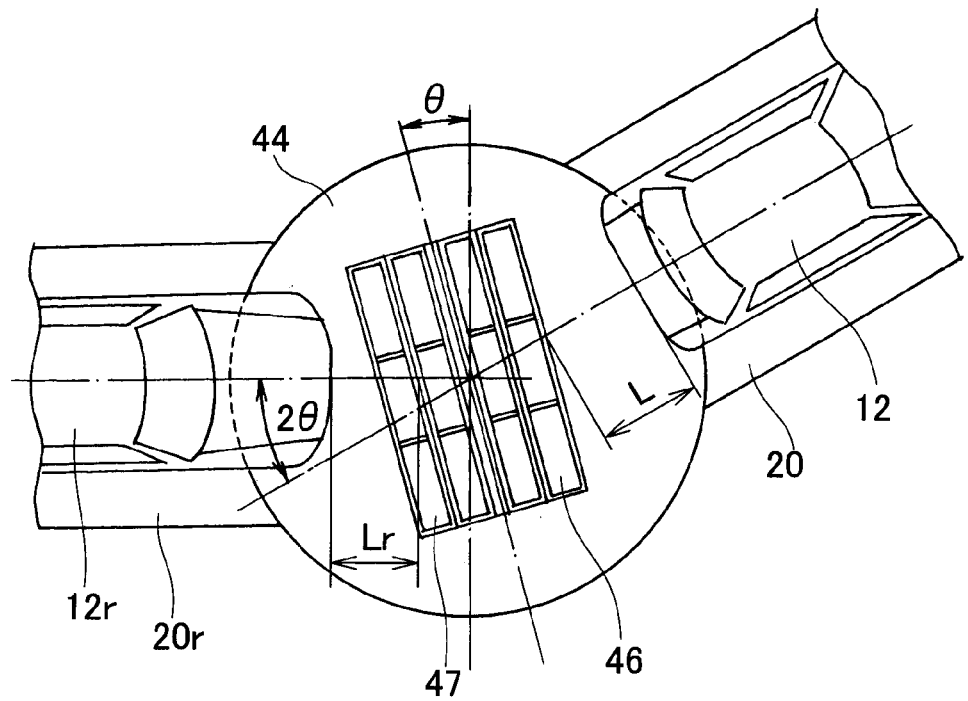
(b) TURN

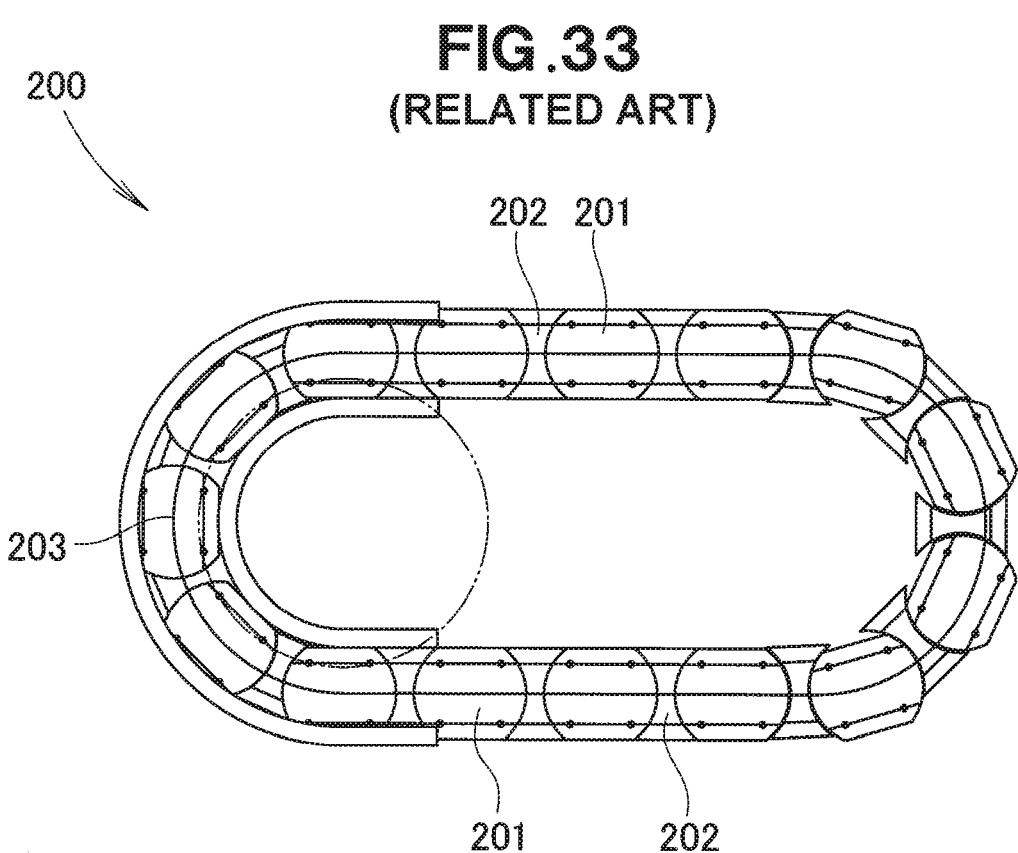

VEHICLE BODY COMPONENT MOUNTING SYSTEM

TECHNICAL FIELD

The present invention relates to a vehicle body component mounting system whereby components are mounted on a vehicle body which is a workpiece.

BACKGROUND ART

A line production system is a main stream applied in mounting components on a vehicle body, but recently a cell production system comes to be also applied. The line production system is a method whereby components are mounted on the vehicle bodies, which is moving slowly and continuously, by the hands of operators who are waiting on the side of the line. The cell production system is a method whereby component boxes are disposed around a vehicle body and the components taken out from the component boxes are mounted on the vehicle body. So far, various kinds of the cell production system are proposed as disclosed in Patent Literature 1, for example.

A working carriage used in the cell production system disclosed in Patent Literature 1 includes: fixed wheels and free wheels at a lower portion of a support pillar; and a working table is disposed at an upper portion of the support pillar. The working carriage can be manually pushed because the fixed wheels and free wheels are provided.

Therefore, the working carriage is moved by an operator's pushing work along a production line from "START" to "END". During this time, a component manually taken out by the operator from a component shelf is mounted on a mounting target such as a vehicle body.

The operator stops the working carriage on the side of a desired component shelf and mounts the component, and then moves the working carriage to a next component shelf. Since the working carriage is repeatedly moved and stopped, a stop period of the working carriage is varied depending on operator's skill. As a result, production time control becomes difficult.

According to the technology disclosed in Patent Literature 1, the working carriage is assumed to be a handcart or the like, and therefore, the mounting target loaded on the working carriage is limited to a small-sized article. On the other hand, manufacturing a vehicle body having a length of about 5 meters is also desired. However, in the case where the mounting target is such a large-sized article, the number of components is vastly increased, thereby expanding the production line and elongating an operator's walking distance considerably. In other words, it can be hardly said that the cell production system according to Patent Literature 1 is suitable for the large-sized mounting target such as the vehicle body.

Considering this, desired are a component mounting system and a conveying technology which are suitable for the large-sized mounting target such as the vehicle body and can keep the production time constant.

Additionally, a carriage, a conveyer, etc. may be utilized to convey the workpiece like the vehicle body and the components, but the workpiece and the components can be continuously conveyed by using the conveyer. As a conveyer that conveys the workpiece and components, there is a known conveying technology whereby the workpiece such as the vehicle body is conveyed (see Patent Literature 2, for example.). FIG. 33 is a diagram illustrating the conveyer disclosed in Patent Literature 2.

As illustrated in FIG. 33, a conveyer 200 is used for assembling and conveying the vehicle body. On the conveyer 200, a supporting floor panel 201 having both ends projected arc-shaped and an intermediate floor panel 202 having both ends recessed arc-shaped are arranged such that a projected arc-shaped portion is fitted into a recessed arc-shaped portion.

The intermediate floor panel 202 is connected rotatable around a center shaft of the projected arc-shaped portion of the supporting floor panel 201. At a curve of a vehicle body conveyance passage 203, the recessed arc-shaped portion moves along the projected arc-shaped portion, and there is no gap generated between the supporting floor panel 201 and the intermediate floor panel 202.

In the case where the workpiece is a vehicle body, components are needed to be mounted on the vehicle body. To mount the components on the vehicle body placed on the conveyer 200, the components are needed to be mounted on the moving vehicle body. Therefore, mounting the components becomes easy when the components and the vehicle body are placed together on the conveyer 200. The vehicle body is placed on the conveyer 200 by a lift or the like.

However, since the vehicle body conveyance passage 203 is in a closed state, extra work is necessary to place a plurality of components on the conveyer 200 from a different place, and it is difficult to efficiently supply the components to the conveyance passage 203.

Therefore, demanded is a component conveying system that can efficiently convey and supply components to a conveyance passage by which workpieces are continuously conveyed.

PRIOR ART LITERATURE

Patent Literature

Patent Literature 1: JP 2003-251575 A
Patent Literature 2: JP 2007-526861 W

SUMMARY OF INVENTION

Technical Problem

An object of the present invention is to provide a component mounting system and a conveying technology which are suitable for a large-sized mounting target such as a vehicle body and can easily keep a constant production time.

Further, another object of the present invention is to provide a component conveying system capable of efficiently conveying and supplying the components to a conveyance passage by which the workpieces such as vehicle bodies are continuously conveyed.

Solution to Problem

According to a first aspect of the invention, provided is a vehicle body component mounting system configured to mount components on a vehicle body of an automobile, including: a center component mounting work area in which the vehicle body is conveyed while being lifted and at least an engine is mounted on the vehicle body during the conveyance; an upstream component mounting work area in which a kind of components needed to be mounted before the engine is mounted is mounted on the vehicle body based on a cell production system; and a downstream component mounting work area in which a kind of components needed to be mounted after the engine is mounted is mounted on the vehicle body based on the cell production system. The upstream component mounting work area, the center component mounting work area, and the downstream component mounting work area are arranged in order along a conveyance passage of the vehicle body.

According to a second aspect of the invention, preferably, the upstream component mounting work area in which the cell production system is executed includes a U-shape conveyance passage projected in a lateral direction with respect to the conveyance passage of the center component mounting work area.

According to a third aspect of the invention, preferably, the downstream component mounting work area in which the cell production system is executed includes a U-shape conveyance passage projected in a lateral direction with respect to the conveyance passage of the center component mounting work area.

According to a fourth aspect of the invention, provided is a conveying carriage unit configured to convey components and a workpiece as a mounting target on which the components are mounted, including: a component carriage configured to convey the components; and a workpiece carriage arranged in front or back of the component carriage, also connected to the component carriage in a separable manner, and configured to convey the workpiece. The component carriage includes a carriage body, a carriage upper floor mounted on the carriage body and also configured such that an operator can ride, and a component housing section disposed at the carriage upper floor and configured to house the components. The workpiece carriage includes a work floor on which the operator rides, and the conveying carriage unit is connected to preceding and following conveying carriage units in a turnable manner.

According to a fifth aspect of the invention, preferably, the component housing section includes a first component housing section configured to house components to be mounted on the workpiece, and a second component housing section disposed in front or back of the workpiece and configured to house components to be mounted on the workpiece. The carriage upper floor is a turntable supported by the carriage body in a rotatable manner, and rotation of the turntable is controlled by a rotation angle control section such that a distance from the first component housing section to the workpiece becomes substantially equal to a distance from the second component housing section to the workpiece disposed in front or back.

According to a sixth aspect of the invention, preferably, the workpiece carriage is disposed in back of the component carriage, and right and left sub-component carriages are further connected to the component carriage, having the left sub-component carriage disposed on a left side of the workpiece carriage and the right sub-component carriage disposed on a right side of the workpiece carriage.

According to a seventh aspect of the invention, provided is a component conveying system in which a floor panel having both ends recessed arc-shaped and configured to load a workpiece and a carriage upper floor having both ends projected arc-shaped and configured to load components to be mounted on the workpiece are arranged such that the projected arc-shaped portion is fitted into the recessed arc-shaped portion, the floor panel is connected to the carriage upper floor in a separable and rotatable manner around a center shaft of the projected arc-shaped portion of the carriage upper floor, and also configured to be conveyed continuously. The component conveying system includes: a U-shape conveyance passage disposed at a conveyance passage for the workpiece and configured to guide the floor panel and the carriage upper floor mutually connected via at least one curved portion; a connect station disposed at an upstream side end portion of the U-shape conveyance passage and configured to connect the floor panel to the carriage upper floor; a release station disposed at a downstream side end portion of the U-shape conveyance passage and configured to release connection of the floor panel from the carriage upper floor, and a component station configured to bring in the carriage upper floor released at the release station, fill the carriage upper floor with the components, and send out the carriage upper floor to the connect station.

According to an eighth aspect of the invention, preferably, the component conveying system further includes: a load station whereby the workpiece is loaded on the floor panel before the floor panel reaches the connect station; and an unload station whereby the workpiece is unloaded from the floor panel after the floor panel has passed the release station, wherein the floor panel is conveyed from the unload station to the load station in a circulating manner.

According to a ninth aspect of the invention, preferably, the component station includes a collect station configured to collect an emptied component housing section from the carriage upper floor after the carriage upper floor has passed the release station, and a supply station configured to supply the carriage upper floor with the component housing section filled with the components before the carriage upper floor reaches the connect station, and the carriage upper floor is conveyed from the collect station to the supply station in a circulating manner.

According to an tenth aspect of the invention, provided is a conveying carriage unit configured to convey components and a workpiece as a mounting target on which the components are mounted, including: a workpiece carriage configured to convey the workpiece; and a component carriage disposed adjacent to the workpiece carriage and configured to convey a part of the components. The workpiece carriage includes a work floor on which an operator rides, the component carriage includes a carriage body, a carriage upper floor mounted on the carriage body, and a component housing section disposed on the carriage upper floor and configured to house a part of the components, and the conveying carriage unit is connected to preceding and following conveying carriage units in a turnable manner.

According to an eleventh aspect of the invention, provided is a conveying carriage unit configured to convey components and a workpiece as a mounting target on which the components are mounted, including: a workpiece carriage configured to convey the workpiece; a component carriage disposed adjacent to the workpiece carriage and configured to convey a part of the components, and right and left sub-component carriages pulled by the component carriage or the workpiece carriage and configured to convey a remaining part of the components. The workpiece carriage includes a work floor on which an operator rides, the component carriage includes a carriage body, a carriage upper floor mounted on the carriage body, and a component housing section disposed on the carriage upper floor and configured to house a part of the components, the right and left sub-component carriages are disposed on the sides of a workpiece carriage of a following conveying carriage unit, and the conveying carriage unit is connected to preceding and following conveying carriage units in a turnable manner.

According to a twelfth aspect of the invention, preferably, the component housing section includes a first component housing section configured to house components to be mounted on the workpiece, and a second component housing section configured to house components to be mounted on a workpiece disposed in back of the workpiece. The carriage upper floor is a turntable supported by the carriage body in a rotatable manner, and rotation of the turntable is controlled by a rotation angle control section such that a distance from the first component housing section to the workpiece becomes substantially equal to a distance from the second component housing section to the workpiece disposed in back.

According to a thirteenth the invention, provided is a component conveying system including: a connection release station disposed on a workpiece conveyance passage and configured to release connection between preceding and following conveying carriage units, and an equipment mounting station whereby equipment is mounted on the workpiece from a side on the following conveying carriage unit when the preceding conveying carriage unit moves forward and the following conveying carriage unit has the side of the workpiece carriage opened.

Advantageous Effects of Invention

According to the first aspect of the invention, the upstream component mounting work area based on a cell production system, the center component mounting work area in which the vehicle body is conveyed by an overhead conveyer, and the downstream component mounting work area based on the cell production system are arranged along the conveyance passage of the vehicle body in this order.

The components to be mounted on the vehicle body conveyed from a coating process are various. However, as for the engine, one engine is mounted on one vehicle body although its size and shape are varied by the displacement. As for a suspension also, four suspensions of front, back, right and left in total are mounted on one vehicle although its size and shape are varied. Thus, the components (such as the engine) having a constant component count are mounted in the center component mounting work area. Additionally, other components to be mounted on a floor bottom surface of the vehicle body are mounted. Since the mounting work is carried out during slow movement by the overhead conveyer, the work based on a line production system is executed in the center component mounting work area.

The number of components such as interior trim is increased in a so-called classy car, compared to a typical car. In other words, the number of components other than main components (an engine, etc.) is varied by the kinds of vehicle. In the case where the components other than the main components are mounted based on the line production system, a line length is necessarily elongated because the line length is determined in consideration of a maximum number of the components.

According to the present invention, the components other than the main components are mounted based on the cell production system. According to the cell production system, increase of the line length is suppressed because increase of the components can be handled by increasing the number of component boxes. In other words, the present invention is based on the line production system, and concurrently the cell production system is applied in part. Therefore, elongating the line length is suppressed.

Further, since the present invention is based on the line production system, variation of a production time can be avoided, and the production time is kept constant. Therefore, according to claim 1, the present invention is suitable for a large-sized mounting target such as the vehicle body, and capable of easily keeping the constant production time and also reducing the line length.

According to the second aspect of the invention, the upstream component mounting work area where the cell production system is executed includes the U-shape conveyance passage laterally projected with respect to the conveyance passage of the center component mounting work area. The number of components needed to be mounted before the engine is mounted can be increased or reduced by adjusting the projected length of the U-shape conveyance passage. Since an apparent line length is determined by a direction of the conveyance passage of the center component mounting work area, the apparent line length is not influenced even though the projected length of the U-shape conveyance passage is increased. Therefore, the apparent line length can be reduced by adopting the U-shape conveyance passage.

According to the third aspect of the invention, the downstream component mounting work area where the cell production system is executed includes the U-shape conveyance passage projected in the lateral direction with respect to the conveyance passage of the center component mounting work area. The number of components needed to be mounted after the engine is mounted can be increased or reduced by adjusting the projected length of the U-shape conveyance passage. Since an apparent line length is determined by the direction of the conveyance passage of the center component mounting work area, the apparent line length is not influenced even though the projected length of the U-shape conveyance passage is increased. Therefore, the apparent line length can be reduced by adopting the U-shape conveyance passage.

According to the fourth aspect of the invention, since the workpiece carriage and the component carriage can be connected, the workpiece carriage and the component carriage can be continuously conveyed. The operator can work while riding the component carriage or the workpiece carriage. Since there is no need to stop the workpiece carriage for a long time, the production time is kept constant.

Also, the conveying carriage unit is connected to the preceding and following conveying carriage units in a turnable manner, and therefore, a conveying traffic line can be meandered. A length of the conveying traffic line can be elongated by such meandering, and expansion of an assembly work area can be avoided.

Further, one of the workpiece carriage and the component carriage is made to self-travel, thereby achieving to pull the other one. Consequently, the operator does not need to manually push the carriage, and a heavy article like the vehicle body can be conveyed. Therefore, according to claim 4, the present invention is suitable for the large-sized mounting target such as the vehicle body, and the production time can be easily kept constant.

According to the fifth aspect of the invention, rotation of the turntable is controlled by the rotation angle control section such that the distance from the first component housing section to the workpiece becomes substantially equal to the distance from the second component housing section to the workpiece disposed in front or back. By controlling rotation of the turntable, work efficiency related to the first component housing section and work efficiency related to the second component housing section is equalized. As a result, component mounting work can be leveled.

According to the sixth aspect of the invention, the right and left sub-component carriages are additionally connected to the component carriage, having the left sub-component carriage disposed on the left side of the workpiece carriage and the right sub-component carriage disposed on the right side of the workpiece carriage. The moving distance of the component can be shortened, thereby improving operating efficiency.

According to the seventh aspect of the invention, the connect station disposed at the upstream side end portion of the U-shape conveyance passage and configured to connect the floor panel to the carriage upper floor, and the release station disposed at the downstream side end portion of the U-shape conveyance passage and configured to release connection of the floor panel from the carriage upper floor are provided.

Since the floor panel can be separated from the carriage upper floor, the carriage upper floor released at the release station can be brought into the component station, and the carriage upper floor is filled with the components and then sent out to the connect station. As a result, work efficiency in supplying the components is improved, and the components can be efficiently conveyed and supplied to the conveyance passage by which the workpieces are continuously conveyed.

According to the eighth aspect of the invention, the load station whereby the workpiece is loaded on the floor panel before the floor panel reaches the connect station, and the unload station whereby the workpiece is unloaded from the floor panel after the floor panel has passed the release station are provided.

The workpiece mounted with the components is unloaded from the floor panel, and the emptied floor panel is promptly conveyed from the unload station to the load station in a circulating manner. Therefore, productivity can be improved.

According to the ninth aspect of the invention, the component station includes the collect station configured to collect the emptied component housing section from the carriage upper floor, and the supply station configured to supply the component housing section filled with the components to the carriage upper floor.

Since the emptied component housing section is only replaced by the component housing section already filled with a plurality of components, man-hours for supplying the components to the carriage upper floor can be shortened. In addition, since the carriage upper floor is promptly conveyed from the collect station to the supply station in a circulating manner, productivity in supplying the components can be improved. Thus, according to the present invention, supplying the workpiece and supplying the components can be separately and concurrently executed in the workpiece conveyance passage, and therefore, productivity can be more improved.

According to the tenth aspect of the invention, the conveying carriage unit includes the workpiece carriage disposed adjacent to the component carriage, and therefore, the workpiece carriage and the component carriage can be continuously conveyed. The operator can work while riding the conveying carriage unit. Since there is no need to stop the conveying carriage unit for a long time while the operator is mounting the components, the production time is kept constant.

Further, the conveying carriage unit has the side of the workpiece carriage opened. Since the lifter can be disposed on the side of the workpiece carriage, the heavy article such as the vehicle body can be moved from the workpiece carriage by the lifter. As a result, the lifter can be used while the workpiece carriage is disposed adjacent to the component carriage without separating the component carriage from the workpiece carriage, and productivity can be improved.

According to the eleventh aspect of the invention, the component carriage is disposed adjacent to the workpiece carriage in the conveying carriage unit, and therefore, the workpiece carriage and the component carriage can be continuously conveyed. The operator can work while riding the conveying carriage unit. Since there is no need to stop the conveying carriage unit for a long time while the operator is mounting the components, the production time is kept constant.

Further, since the conveying carriage unit is connected to the preceding and following conveying carriage units in a turnable manner, the conveying traffic line can be meandered. The length of the conveying traffic line can be elongated by such meandering, and expansion of an assembly work area can be avoided.

Furthermore, the operator does not need to manually push the carriage because the conveying carriage unit is self-traveled or moved by being hooked on a chain hook which moves in a circulating manner. Consequently, a large amount of the components can be conveyed and further the heavy article such as the vehicle body can be conveyed. Therefore, according to claim 11, the present invention is suitable for the large-sized mounting target such as the vehicle body, and the production time can be easily kept constant.

Moreover, the components are loaded on the conveying carriage unit and also the operator rides on the same conveying carriage unit, thereby positioning the components near the operator. Therefore, the moving distance of the operator can be shortened and working efficiency can be improved.

Additionally, the side of the workpiece carriage of the following conveying carriage unit is opened when connection of the preceding conveying carriage unit is released and is moved forward. Since the lifter can be disposed on the side of the workpiece carriage, the heavy article such as the vehicle body can be moved from the workpiece carriage by the lifter. As a result, the lifter can be used while the workpiece carriage is disposed adjacent to the component carriage without separating the component carriage from the workpiece carriage, and productivity can be improved.

According to the twelfth aspect of the invention, rotation of the turntable is controlled by the rotation angle control section such that the distance from the first component housing section to the workpiece becomes substantially equal to the distance from the second component housing section to the workpiece disposed in front or back. By controlling rotation of the turntable, work efficiency related to the first component housing section and work efficiency related to the second component housing section is equalized. As a result, component mounting work can be leveled.

According to the thirteenth aspect of the invention, the connection release station and the equipment mounting station are provided. When connection between the preceding and following conveying carriage units is released and the preceding conveying carriage unit is moved forward, the side of the workpiece carriage of the following conveying carriage unit is opened. An assist device configured to assist in lifting the equipment can be disposed on the side of the workpiece carriage. As a result, the large equipment such as a sheet can be mounted on the workpiece like the vehicle body on the following conveying carriage unit, and operating efficiency can be improved.

BRIEF DESCRIPTION OF DRAWINGS

FIGS. 8(a) and 8(b) are diagrams illustrating operation of the conveying carriage unit.

FIGS. 23(a) and 23(b) are diagrams illustrating operation of the conveying carriage unit.

FIG. 33 is a schematic diagram illustrating a conveying technology for a vehicle body or the like in a related art.

DESCRIPTION OF EMBODIMENTS

Preferred embodiments according to the present invention will be described below in detail based on the attached drawings.

First Embodiment

A system for mounting vehicle body components and conveying the components according to the present invention is implemented by a "component mounting facility". A "conveying carriage unit" is an important element among elements constituting the component mounting facility. Accordingly, the "conveying carriage unit" will be described first, and later the "component mounting facility" will be described.

Figure 1:
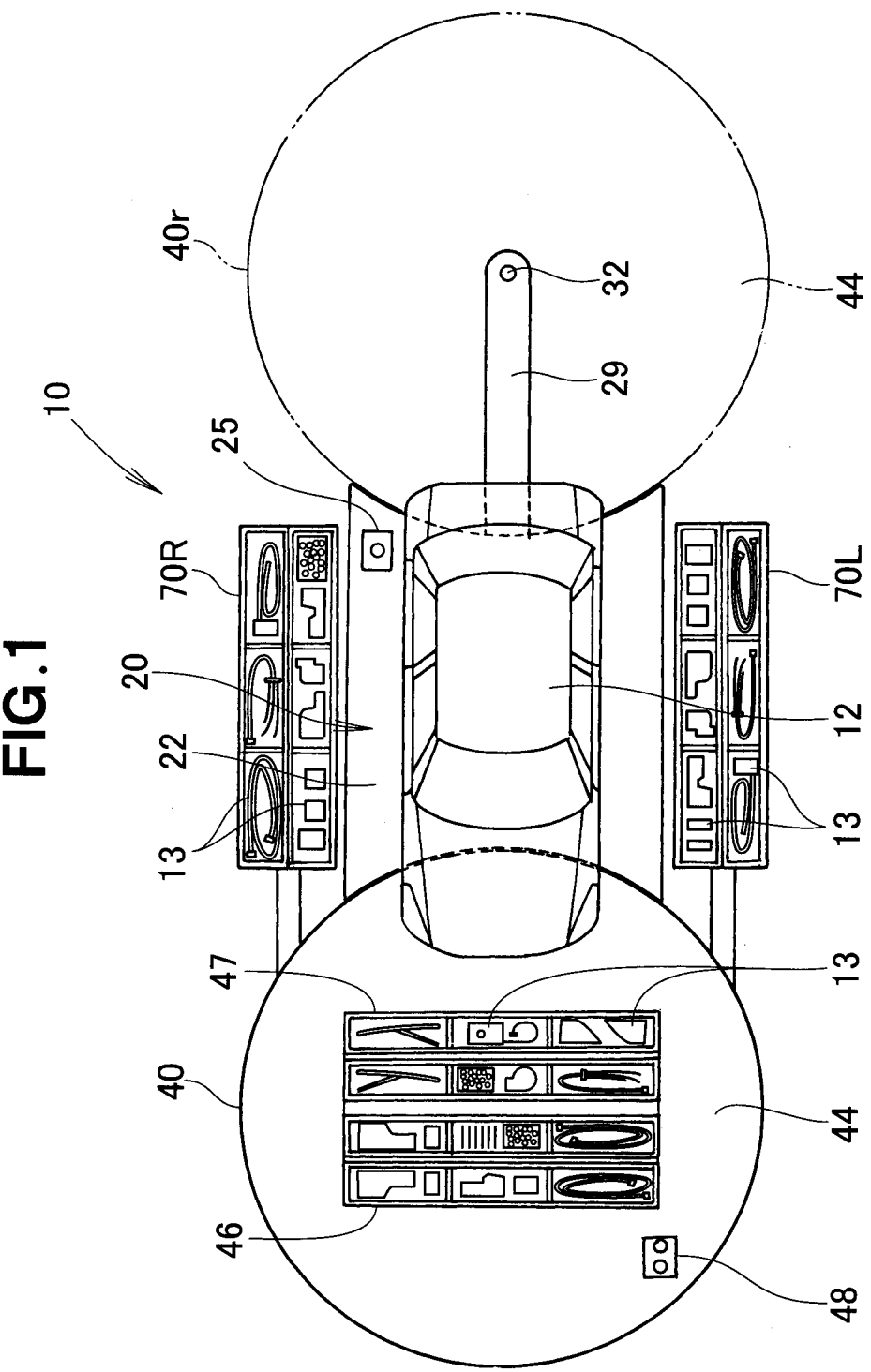
FIG. 1 is a plan view illustrating a conveying carriage unit according to a first embodiment of the present invention.

As illustrated in FIG. 1, a conveying carriage unit 10 includes a workpiece carriage 20 configured to convey a vehicle body 12 as a workpiece (mounting target), a component carriage 40 disposed in front of the workpiece carriage 20 and configured to convey a component 13, and right and left sub-component carriages 70L, 70R pulled by the component carriage 40 and disposed on the sides of the workpiece carriage 20. A reference sign 40r indicated by an imaginary line is a component carriage following behind.

The carriages 20, 40, 70L, and 70R will be individually described in detail.

Figure 2:
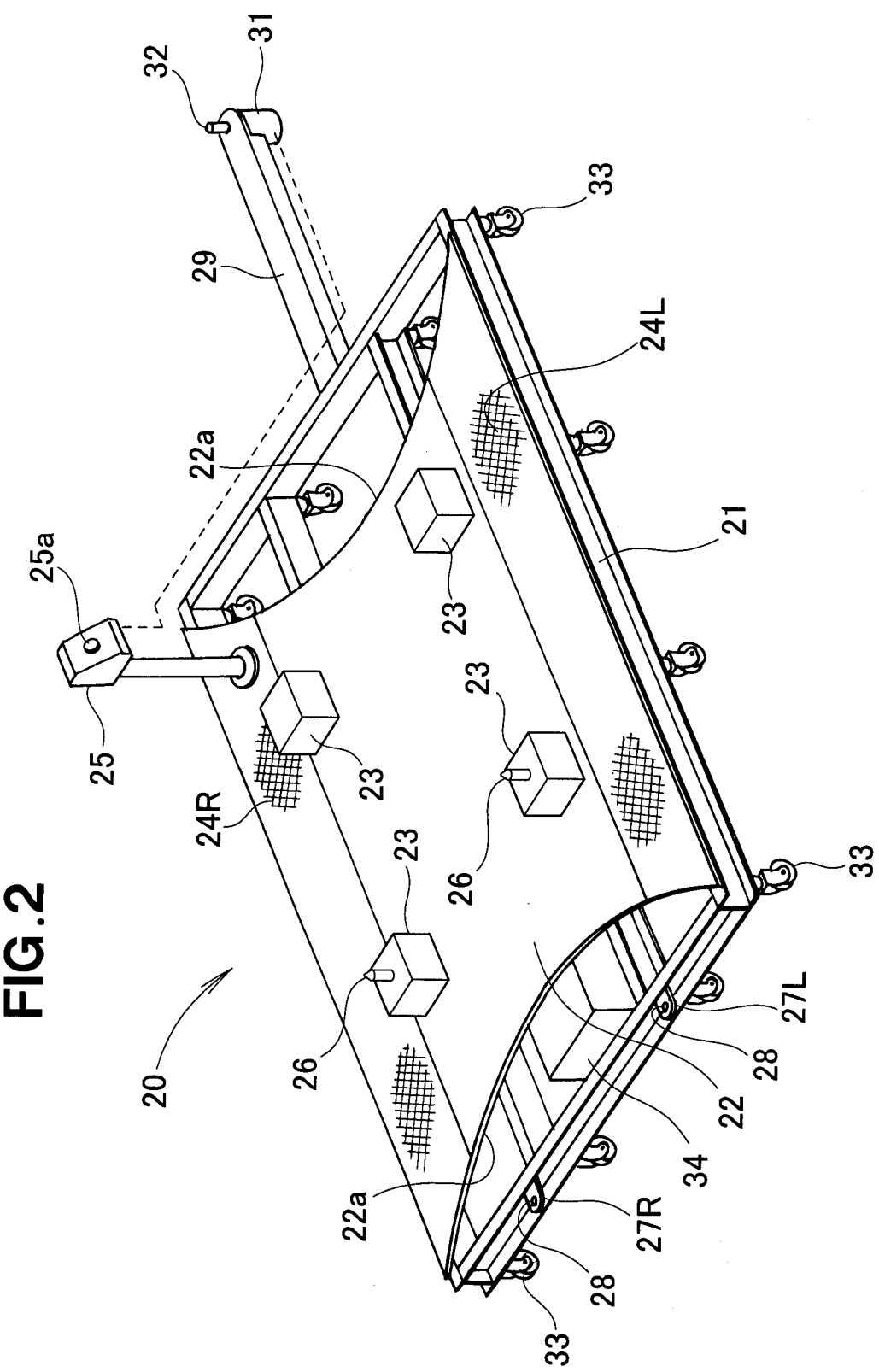
FIG. 2 is a perspective view illustrating a workpiece carriage illustrated in FIG. 1.

As illustrated in FIG. 2, main elements of the workpiece carriage 20 are a frame body 21 formed by assembling steel material in a lattice shape, a floor panel 22 laid over the frame body 21, and four workpiece receiving bases 23 placed on the floor panel 22. The floor panel 22 includes recessed arc-shaped portions 22a, 22a formed by cutting front and rear portions in a recessed arc-shape. Additionally, the floor panel 22 includes work floors 24L, 24R applied with non-slip work on right and left side portions of the floor panel. A first operation post 25 is disposed at a rear portion of the one work floor 24R.

Positioning pins 26, 26 are erected on the workpiece receiving bases 23, 23 respectively. The vehicle body 12 (FIG. 1) is positioned in a horizontal direction by these positioning pins 26, 26. Then, the vehicle body is supported by the four workpiece receiving bases 23.

Two right and left eye plates 27L, 27R are provided at a front portion of the frame body 21. The eye plates 27L, 27R are the plates having open holes 28 respectively. Further, a long arm 29 is extended rearward from a rear portion of the frame body 21, and a first locking mechanism 31 is provided at a tip of the long arm 29. The first locking mechanism 31 is, preferably, a cylinder unit having a pin 32 protruded upward. The cylinder unit may be any one of an air cylinder, a hydraulic cylinder, and an electric cylinder. The pin 32 can be vertically moved by operating an operating element 25a of the first operation post 25. The operating element 25a may be any one of a push button, a lever, and a touch sensor, regardless of types.

Figure 3:
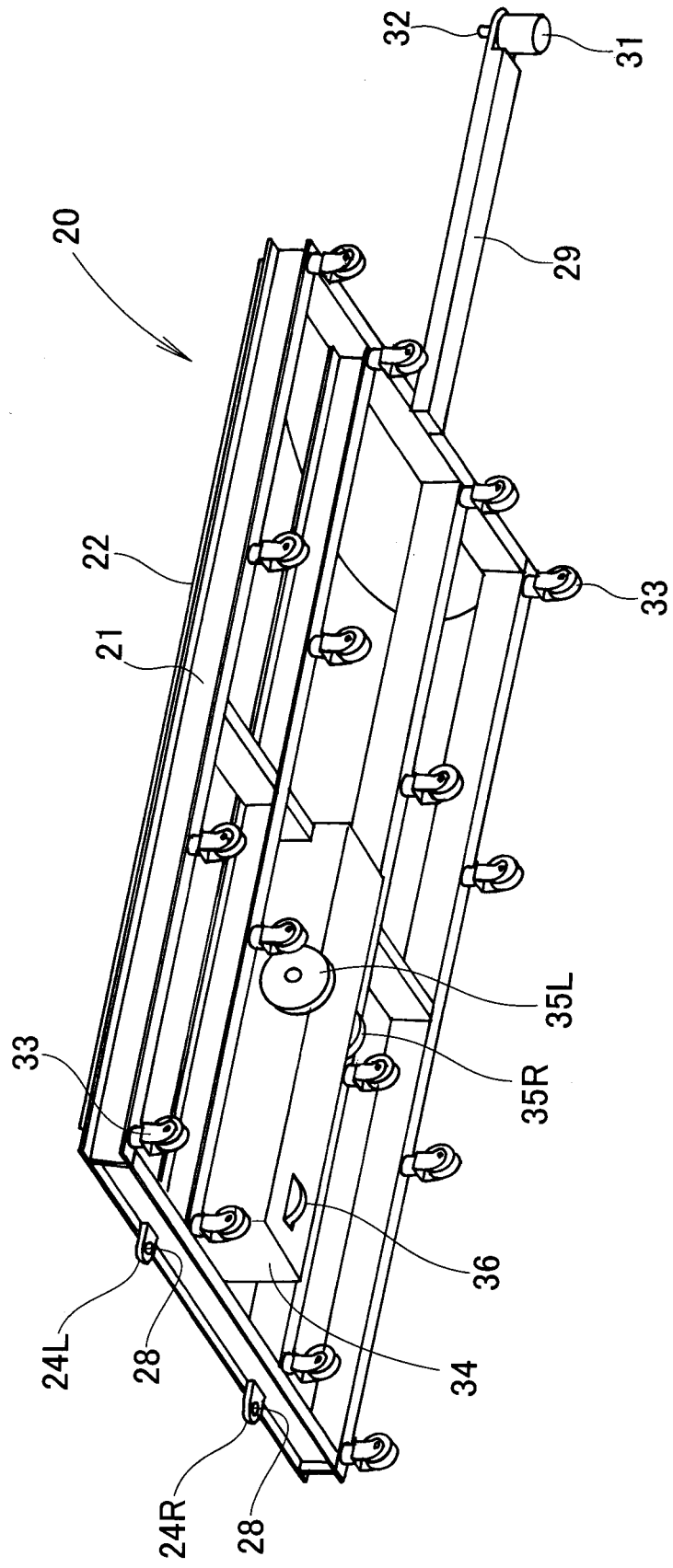
FIG. 3 is a perspective view illustrating the workpiece carriage illustrated in FIG. 2, viewed from a bottom surface.

As illustrated in FIG. 3, a plurality of universal wheels 33 is provided at a lower surface of the frame body 21. The universal wheel 33 is also referred to as a caster, and does not prevent the carriage from turning by the universal wheel itself turning. Additionally, a drive box 34 is provided at a center of the lower surface of the frame body 21. The drive box 34 includes a motor and a drive source inside thereof, and right and left drive wheels 35L, 35R are driven by the drive source. The drive wheels 35L, 35R contact a track (or road surface) and cause the workpiece carriage 20 to self-travel. Further, a guide wheel 36 is protruded from the drive box 34. The guide wheel 36 plays a role of determining a traffic line of the workpiece carriage 20 by being fitted into a U-shape conveyance passage later described. The guide wheel 36 may be a non-rotational guide shoe.

Figure 4:
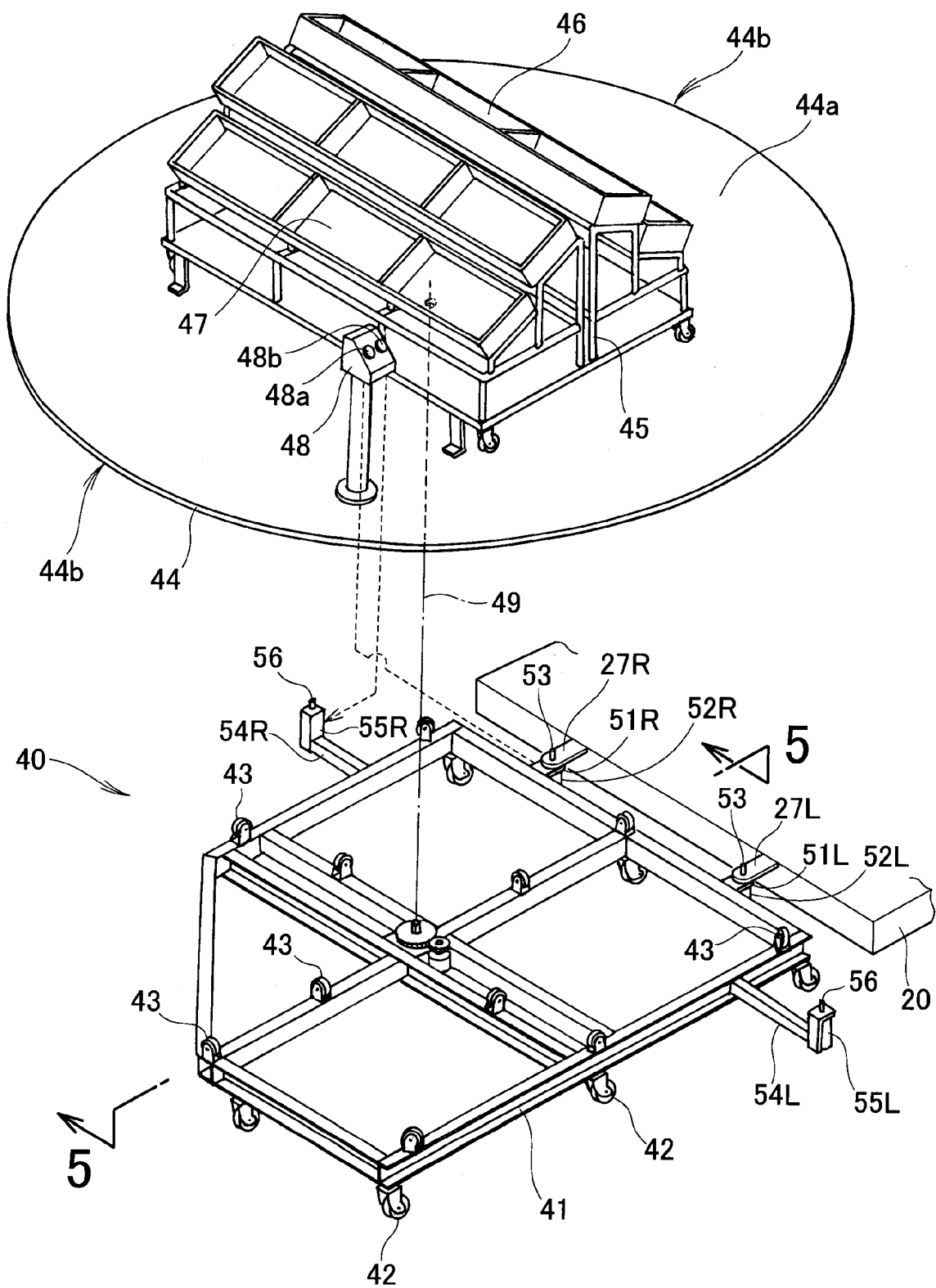
FIG. 4 is an exploded perspective view illustrating a component carriage illustrated in FIG. 1.

As illustrated in FIG. 4, main elements of the component carriage 40 are a carriage body 41 formed by assembling steel material in a lattice shape, a plurality of universal wheels 42 attached to a lower surface of the carriage body 41, a plurality of rollers 43 attached to an upper surface of the carriage body 41, a circular carriage upper floor 44 mounted on the carriage body 41 in a manner placing on the rollers 43, a roof-type frame 45 disposed at the carriage upper floor 44, a first component housing section 46 and a second component housing section 47 provided at the roof-type frame 45. The carriage upper floor 44 is provided with a second operation post 48 including two operating elements 48a, 48b.

On the circular carriage upper floor 44, an area surrounding the first component housing section 46 and second component housing section 47 is set as a work floor 44a, and an operator works on this work floor 44a. Meanwhile, according to the embodiment, the shape of the carriage upper floor 44 has been described to be circular, but not limited thereto, the shape of the carriage upper floor 44 may be other shapes, such as an oval, as long as projected arc-shaped portions 44b, 44b each having a projected arc-shape are formed in front and back of the carriage upper floor 44.

Further, right and left plates 51L, 51R are extended rearward from a rear portion of the carriage body 41, and second locking mechanisms 52L, 52R are provided at the plates 51L, 51R respectively. The second locking mechanisms 52L, 52R are, preferably, cylinder units having pins 53 protruded upward in the same manner as the first locking mechanism 31 (FIG. 2). The cylinder unit may be any one of an air cylinder, a hydraulic cylinder, and an electric cylinder. The pins 53, 53 can be vertically moved by operating an operating element 48a of the second operation post 48.

The pins 53, 53 are fitted into the eye plates 27L, 27R on the workpiece carriage 20 side from below, and therefore, the component carriage 40 travels together with the workpiece carriage 20 without laterally swinging and turning.

Also, side arms 54L, 54R are extended from right and left sides of the carriage body 41, and third locking mechanisms 55L, 55R are provided at the side arms 54L, 54R respectively. The third locking mechanisms 55L, 55R are, preferably, cylinder units having pins 56, 56 protruded upward in the same manner as the second locking mechanisms 52L, 52R. The cylinder unit may be any one of an air cylinder, a hydraulic cylinder, and an electric cylinder. The pins 56, 56 can be vertically moved by operating an operating element 48b of the second operation post 48.

Figure 5:
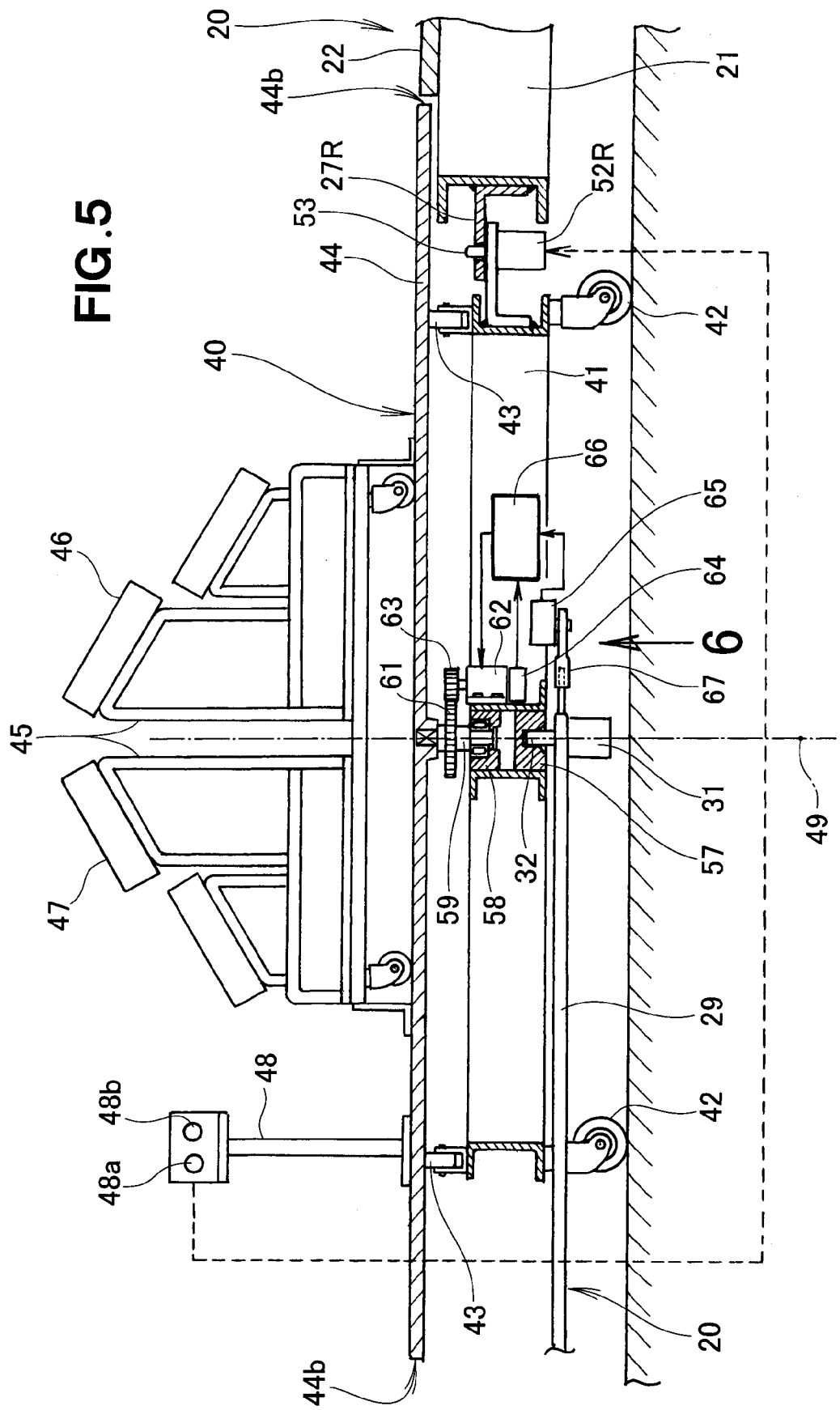
FIG. 5 is a cross-sectional view taken along a line 5-5 in FIG. 4.

As illustrated in FIG. 5, a perforated plate 57 is provided at a lower center portion of the carriage body 41 and a shaft bearing block 58 is provided at an upper center portion thereof. A center shaft 59 is extended downward from a center of the carriage upper floor 44, and a tip of the center shaft 59 is fitted into the shaft bearing block 58. Since the carriage upper floor 44 is supported by the plurality of rollers 43, no downward load is applied to the shaft bearing block 58. The shaft bearing block 58 exerts an effect of guiding the center shaft 59 in a rotatable manner.

A driven gear 61 is provided halfway at the center shaft 59. A servo motor 62 is disposed near the driven gear 61, and the driven gear 61 is rotated by a drive gear 63 driven by the servo motor 62. As a result, the carriage upper floor 44 horizontally turns around the center shaft 59. In other words, the carriage upper floor 44 is a turntable.

The servo motor 62 is provided with an encoder 64 configured to detect a rotation angle and a rotary direction of a motor center shaft 59. Further, the carriage body 41 is provided with a rotary sensor 65 and a rotation angle control section 66 in addition to the servo motor 62. Operation of the rotary sensor 65 will be described later. Note that angle information from the rotary sensor 65 and angle information from the encoder 64 are input to the rotation angle control section 66. The rotation angle control section 66 controls the servo motor 62 based on the angle information.

The pin 32 is positioned at the center shaft 49 of the projected arc-shaped portion 44b (carriage upper floor 44). The pin 32 is vertically moved by operating the operating element 25a illustrated in FIG. 2, thereby connecting the workpiece carriage 20 to the component carriage 40. In other words, the floor panel 22 is connected to the carriage upper floor 44 via the pin 32 in a separable manner.

The workpiece carriage 20 is rotatably connected to the position of the center shaft 49 of the projected arc-shaped portion 44b by the pin 32. In other words, the floor panel 22 is rotatably connected to the carriage upper floor 44 at the position of the center shaft 49.

A front portion of the component carriage 40 is connected to the workpiece carriage 20 on the front side via the pin 53, and a rear portion of the component carriage 40 is connected to the workpiece carriage 20 on the rear side via the pin 32. In other words, the floor panel 22 and the carriage upper floor 44 are alternately and continuously conveyed.

Figure 6:
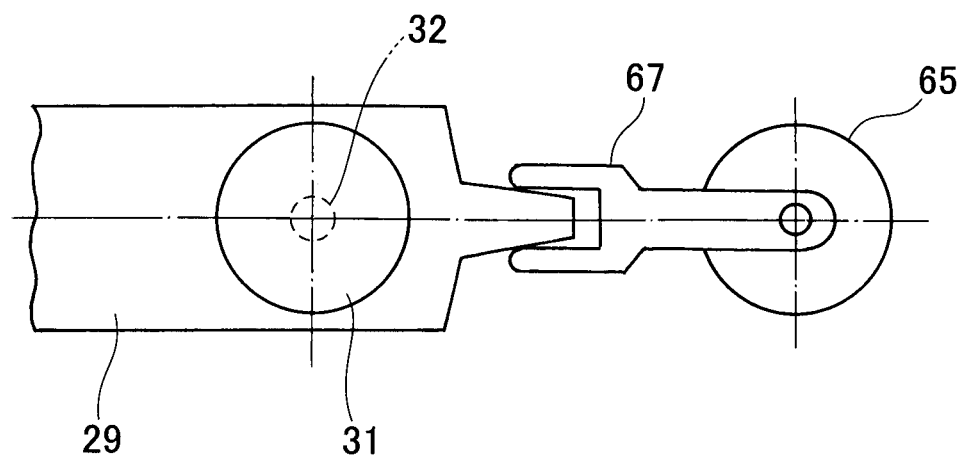
FIG. 6 is a diagram viewed from an arrow 6 in FIG. 5.

As illustrated in FIG. 6, the tip of the long arm 29 is fitted into a fork-shaped arm 67 extending from the rotary sensor 65. In FIG. 6, the fork-shaped arm 67 is not tilted because the long arm 29 is not tilted.

Figure 7:
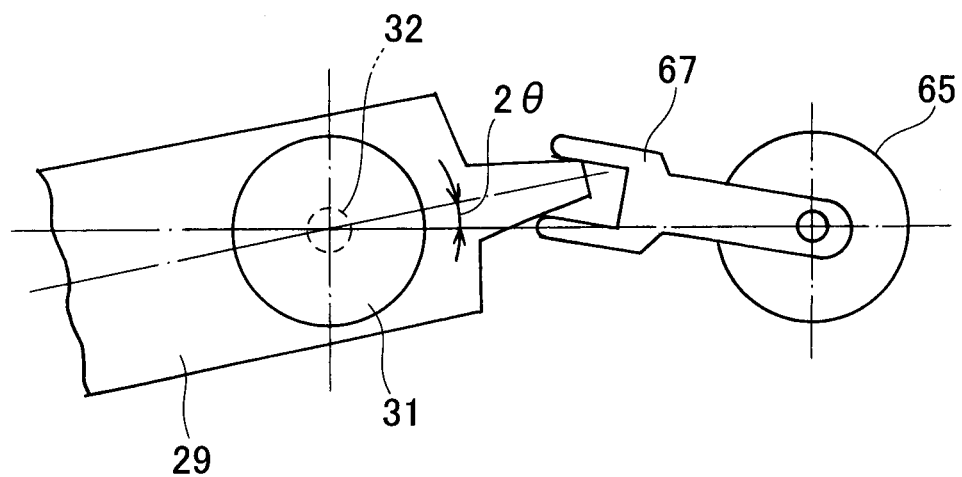
FIG. 7 is a diagram illustrating operation of a rotary sensor illustrated in FIG. 6.

As illustrated in FIG. 5, the long arm 29 is horizontally rotatable around the pin 32 of the first locking mechanism 31. As a result, the long arm 29 may rotate around the pin 32 by only an angle 2θ as illustrated in FIG. 7. The rotation angle 2θ is detected by the rotary sensor 65.

As illustrated in FIG. 8(a), the vehicle body 12 is placed in back of the component carriage 40 and further a preceding vehicle body 12f is placed in front of the component carriage 40. As shown by an arrow (1), a component is taken out from the first component housing section 46 and mounted on the vehicle body 12. Also, as shown by an arrow (2), a component is taken out from the second component housing section 47 and mounted on the preceding vehicle body 12f.

In the case where the preceding workpiece carriage 20f is turned by the angle 2θ with respect to the workpiece carriage 20, the carriage upper floor 44 is rotated by the angle θ as illustrated in FIG. 8(b). This operation is executed by the rotation angle control section 66 (FIG. 5).

As a result, rotation of the turntable (carriage upper floor 44) is controlled by the rotation angle control section 66 such that a distance L from the first component housing section 46 to the vehicle body 12 becomes substantially equal to a distance Lf from the second component housing section 47 to preceding vehicle body 12f (describing by the angle, the angles of the component housing section with respect to the preceding and following vehicle bodies become equal). By controlling rotation of the turntable (carriage upper floor 44), work efficiency related to the first component housing section 46 and work efficiency related to the second component housing section 47 are equalized. As a result, component mounting work can be leveled.

More specifically, as illustrated in FIG. 8(a), conveyance is continuously executed at a constant speed without stop in normal operation. As illustrated in FIG. 8(b), when coming at a corner, the turntable on the component carriage is rotated so as to adjust the angles of the component housing section with respect to the preceding and following vehicle bodies to become equal, thereby minimizing moving distances of operators riding the preceding and following carriages to reach the component.

A turning center of the turntable 44 is the pin 32 illustrated in FIG. 5. The turning center and rotary center (center shaft 59) of the turntable (carriage upper floor 44) is the same axis. More specifically, since the turning center of the conveying carriage unit and the rotary center of the turntable are the same axis, relative positions of the component housing sections 46, 47 with respect to the vehicle body 12 are easily controlled.

Figure 9:
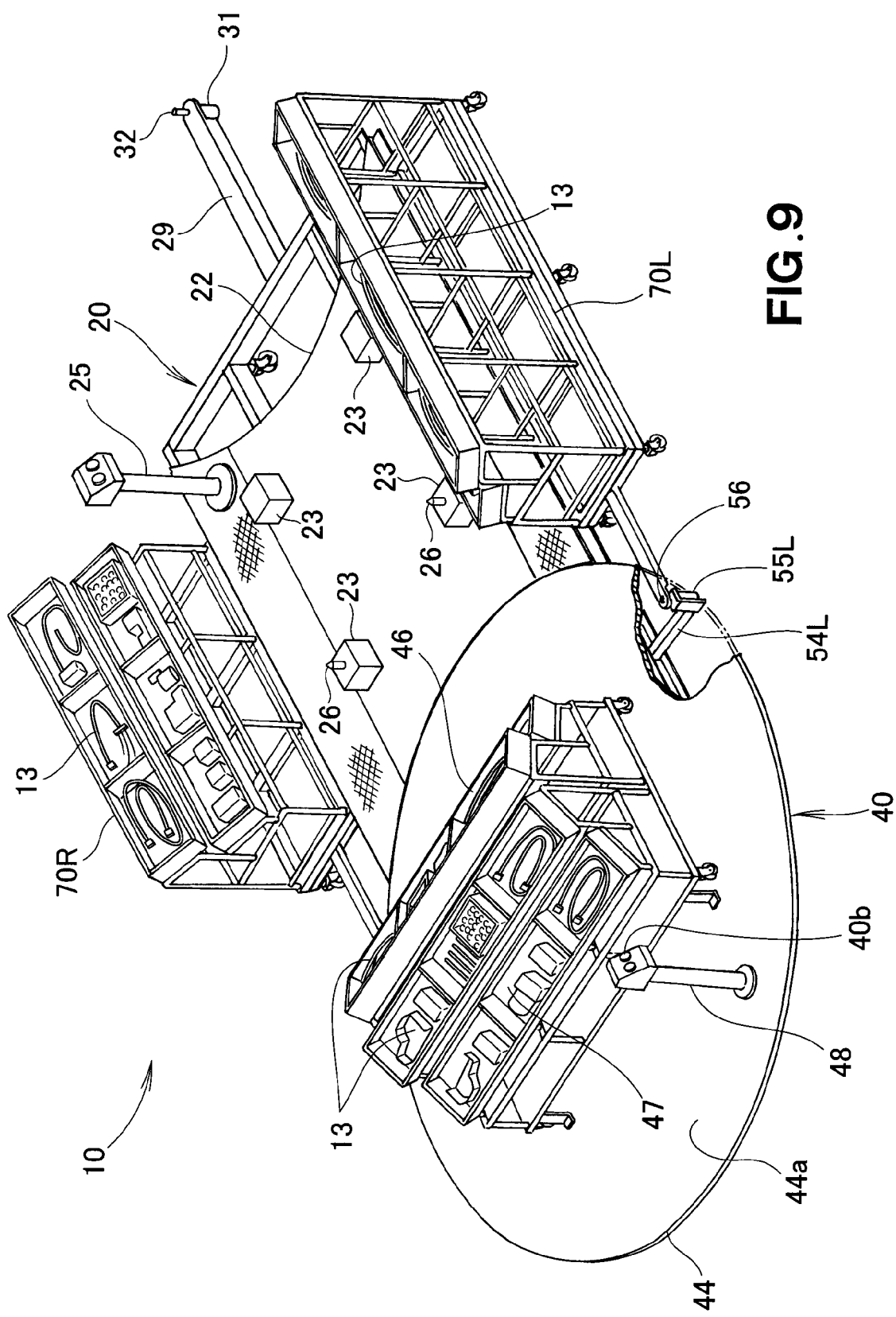
FIG. 9 is a perspective view illustrating the conveying carriage unit illustrated in FIG. 1.

As illustrated in FIG. 9, the right and left sub-component carriages 70L, 70R are pulled by the component carriage 40. A pin 56 of the third locking mechanism 55L can be moved down by operating the operating element 48b provided at the second operation post 48. As a result, the sub-component carriage 70L is separated from the component carriage 40. The sub-component carriage 70R can be separated in the same manner. By operating the operating element 48b, connecting the sub-component carriages 70L, 70R to the component carriage 40 and separating the sub-component carriages 70L, 70R from the component carriage 40 can be optionally executed.

In FIG. 1, the right and left sub-component carriages 70L, 70R are additionally connected to the component carriage 40, having the left sub-component carriage 70L disposed on the left side of the workpiece carriage 20 and the right sub-component carriage 70R disposed on the right side of the workpiece carriage 20. The moving distance of the component can be shortened, thereby improving operating efficiency.

However, the sub-component carriages 70L, 70R can be omitted. Therefore, the necessary elements of the conveying carriage unit 10 are the workpiece carriage 20 and the component carriage 40 placed in front of the workpiece carriage 20. The component carriage 40 may also be placed in back of the workpiece carriage 20 as illustrated by the imaginary line in FIG. 1. Therefore, the component carriage 40 is placed in front or back of the workpiece carriage 20.

More specifically, in FIG. 1, the conveying carriage unit 10 includes the component carriage 40 configured to convey the components, and the workpiece carriage 20 placed in front or back of the component carriage 40, and configured to be connected to the component carriage 40 in a separable manner and convey the workpiece (vehicle body 12). As illustrated in FIGS. 8(a) and (b), the component carriage 40 is connected to the front and back of the workpiece carriage 20 in a turnable manner.

Since the workpiece carriage 20 and the component carriage 40 are connectable, the workpiece carriage 20 and the component carriage 40 can be continuously conveyed. The operator can work while riding on the component carriage 40 or workpiece carriage 20. Since there is no need to stop the workpiece carriage 20 for a long time, the production time is kept constant.

Further, the conveying carriage unit 10 is connected to the preceding and following conveying carriage units 10 in a turnable manner, and therefore, a conveying traffic line can be meandered. The meandered conveying traffic line can elongate the conveying traffic line, and expansion of an assembling area can be avoided.

Further, one of the workpiece carriage 20 and the component carriage 40 is made to self-travel, thereby achieving to pull the other one. Consequently, the operator does not need to manually push the carriage, and a heavy article like the vehicle body can be conveyed.

The component conveying system adopted with the above-described conveying carriage unit 10 will be described below. The component mounting facility 80 for operating the component conveying system is illustrated in FIG. 13. A description will be first provided for each of categories extracted in FIGS. 10 to 12 since the facility configuration is complex.

Figure 10:
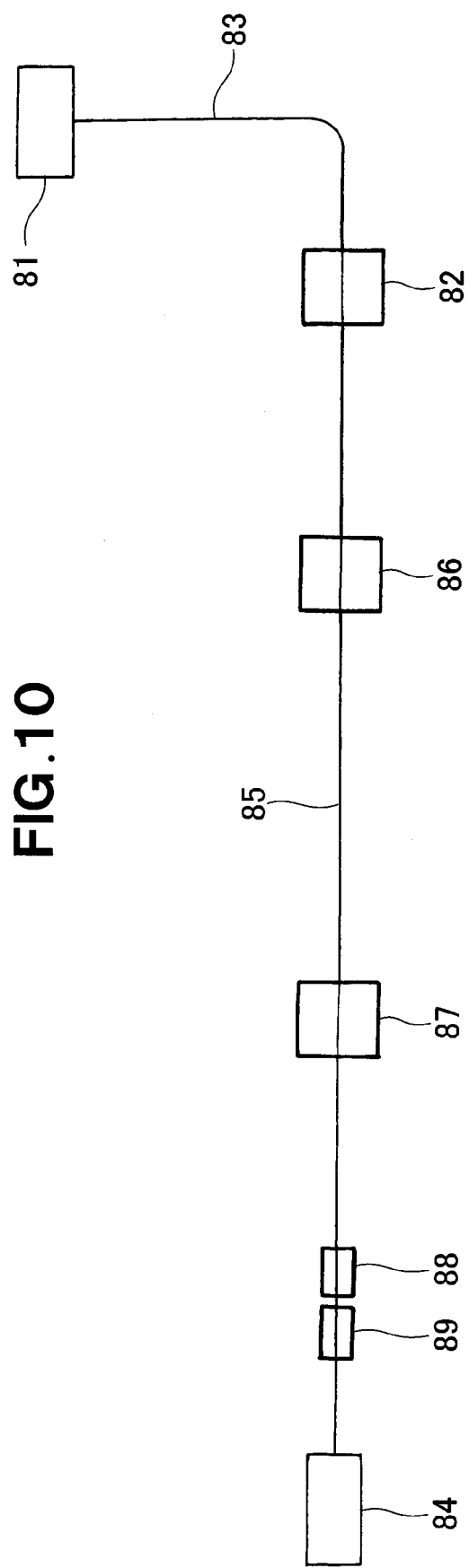
FIG. 10 is a diagram illustrating arrangement of lifters selected from component mounting facility.

FIG. 10 is a diagram illustrating arrangement of lifters, and a discharge line 83 extends from a coating process 81 to a first lifter 82. The discharge line 83 is substantially an L-shaped to change directions. An assembly line 85 extends from the first lifter 82 to an inspection process 84. The first lifter 82, a second lifter 86, a third lifter 87, a fourth lifter 88, and a fifth lifter 89 are arranged on the assembly line 85. The assembly line 85 corresponds to the "conveyance passage" in the present invention.

Figure 11:
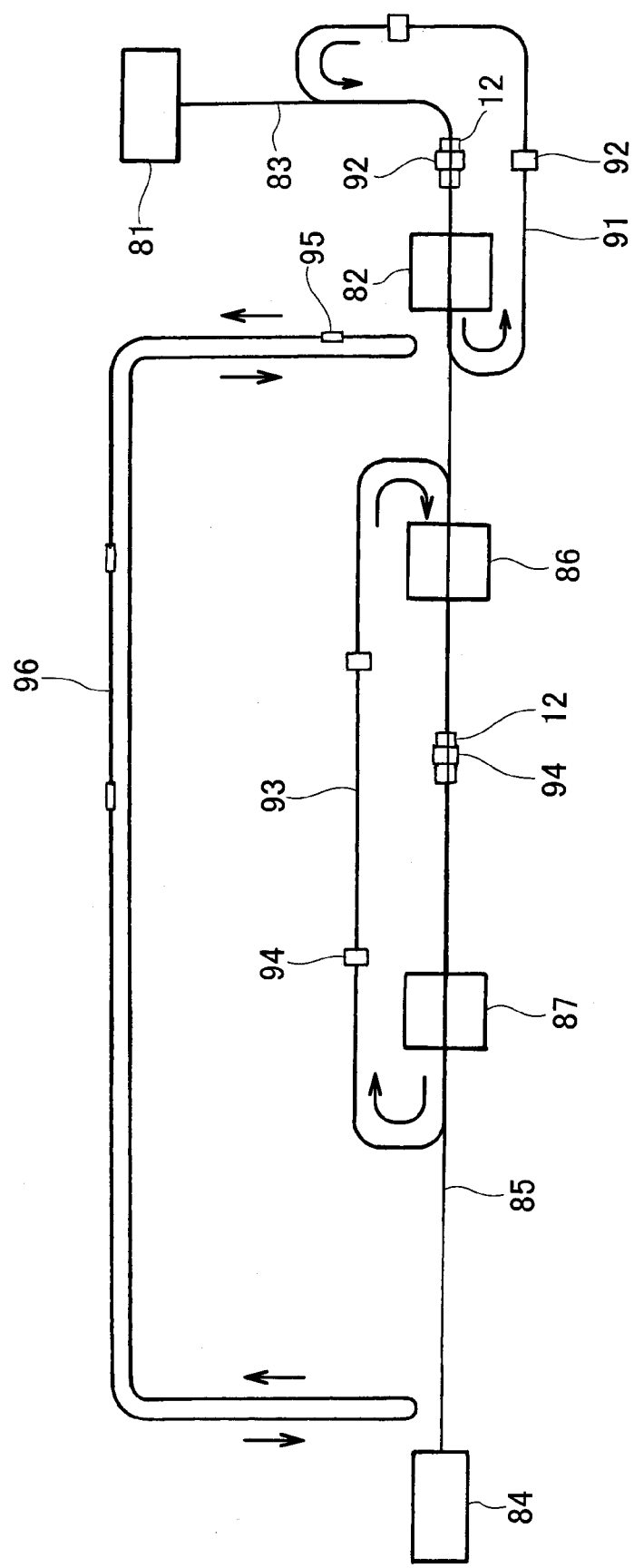
FIG. 11 is a diagram illustrating arrangement of overhead conveyers selected from the component mounting facility.

FIG. 11 is a diagram illustrating arrangement of overhead conveyers, and a first overhead conveyer 91 is arranged along the discharge line 83. The vehicle body 12 finished with coating is hung by a hanger 92 of the first overhead conveyer 91 and carried to above the first lifter 82.

Further, a second overhead conveyer 93 is arranged along the assembly line 85. The second overhead conveyer 93 conveys the vehicle body 12 being hung by the hanger 94, and components to be mounted on the floor bottom surface of the vehicle body, such as an engine, is mounted on the vehicle body 12 while conveying the vehicle body 12.

Additionally, a third overhead conveyer 96 is provided, whereby a door 95 is received between the first overhead conveyer 91 and the second overhead conveyer 93, a window regulator or the like is built in the door 95, and the door is transferred to an entrance side of the inspection process 84.

Figure 12:
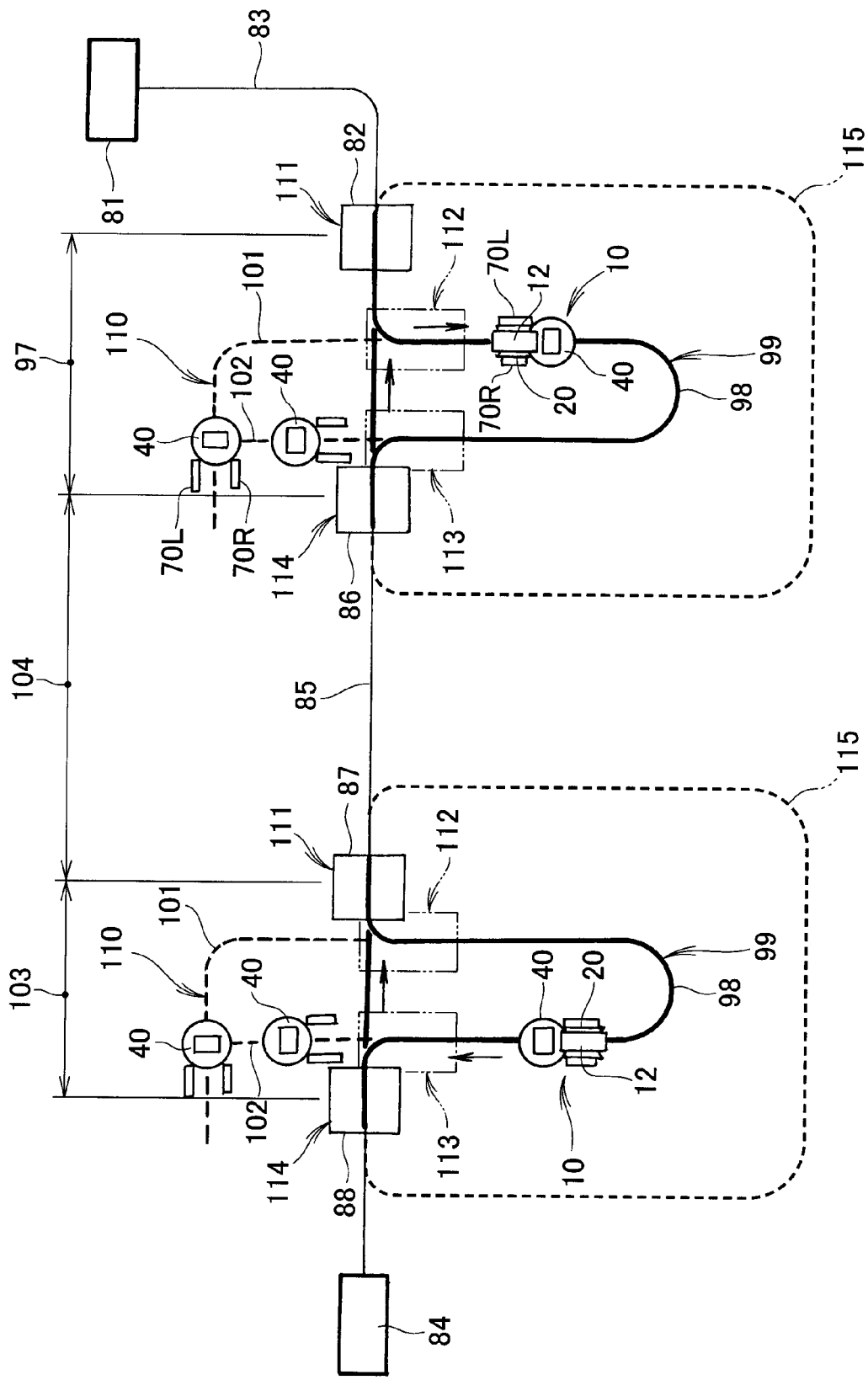
FIG. 12 is a diagram illustrating arrangement of workpiece conveyance passages selected from the component mounting facility.
Figure 13:
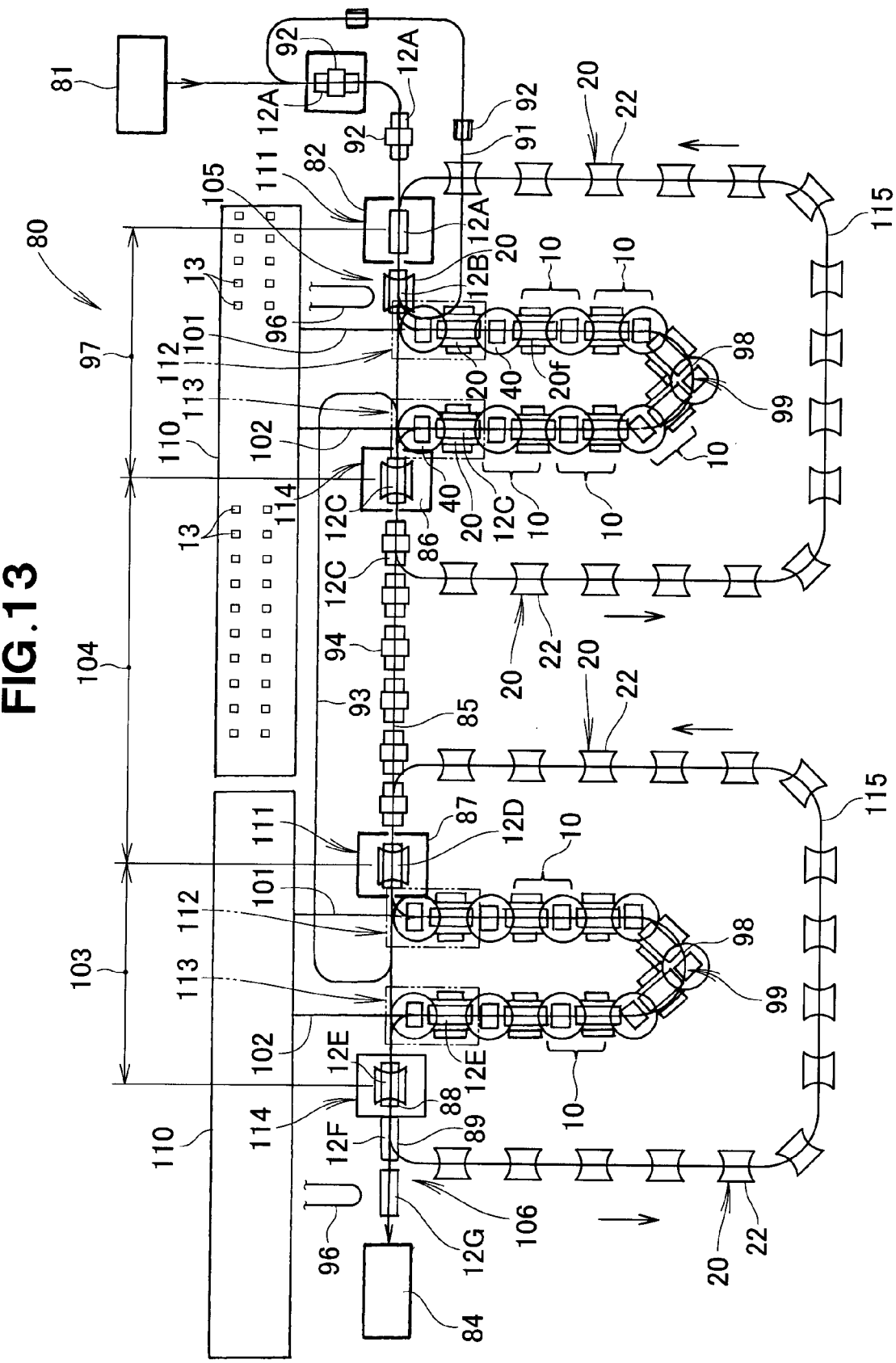
FIG. 13 is a diagram illustrating a detail plan of the component mounting facility.

FIG. 12 is a diagram illustrating arrangement of the conveyance passages for a workpiece, and an upstream component mounting work area 97 is positioned between the first lifter 82 and the second lifter 86, and a U-shape conveyance passage 98 orthogonally or obliquely projected in a lateral direction from the assembly line 85 is disposed between the first lifter 82 and the second lifter 86. The conveying carriage unit 10 loaded with the vehicle body 12 moves along the U-shape conveyance passage 98 having a curved portion 99. Additionally, component-only conveyance passages 101, 102 are connected at a leg portion of the U-shape conveyance passage 98 as indicated by a dash line, and in a component station 110 the component carriage 40 filled with the components is fed to the U-shape conveyance passage 98 from the component-only conveyance passage 101. Further, the emptied component carriage 40 is sent back to the component-only conveyance passage 102 from the U-shape conveyance passage 98. The sub-component carriages 70L, 70R are pulled by the component carriage 40.

A downstream component mounting work area 103 is positioned between the third lifter 87 and the fourth lifter 88, and the U-shape conveyance passage 98 projected in a lateral direction from the assembly line 85 is disposed between the third lifter 87 and the fourth lifter 88. A description for others will be omitted here for being same as the upstream component mounting work area 97.

A center component mounting work area 104 is positioned between the second lifter 86 and the third lifter 87, and components to be mounted on the floor bottom surface of the vehicle body, such as the engine, are mounted in the center component mounting work area 104.

The component mounting facility 80 illustrated in FIG. 13 is completed by combining the above-described configurations. The component mounting facility 80 includes the upstream component mounting work area 97, center component mounting work area 104, and downstream component mounting work area 103.

In the center component mounting work area 104, the components to be mounted on the floor bottom surface of the vehicle body, such as the engine, are mounted on a vehicle body 12C to be conveyed while being hung at the second overhead conveyer 93. More specifically, the components mounted in the work area are an engine front suspension assembly (assembly preliminarily assembled with constituting components of the engine and a front suspension), a rear suspension assembly (assembly preliminarily assembled with constituting components of the a rear suspension), and other components to be mounted on the floor bottom surface of the vehicle body (components that can be mounted on the vehicle body only in a upward moving state). Further, the engine front suspension assembly and rear suspension assembly are respectively conveyed to a mounting station in an assembled state, and lifted by an automatic mounting machine from below the vehicle body, and fastened with a bolt in a docked state with the vehicle body. In this work area, stop-and-go conveyance is executed at least in this station.

In the upstream component mounting work area 97, components needed to be mounted on the vehicle body before the engine is mounted, namely, the components that cannot be mounted after the engine is mounted are mounted based on a cell production system. Examples of such components are members to be mounted on an engine room wall surface (e.g., a radiator, a pedal assembly, a steering column, a brake hose, etc.). Additionally, other components are suitably mounted in the upstream component mounting work area 97.

More specifically, in the upstream component mounting work area 97, a plurality of operators ride on one carriage, and the components are mounted during the time of conveyance from a start point to an end point of this work area. This work corresponds to the work based on the cell production system. In the normal operation, conveyance is continuously executed at a constant speed without stop. When coming at a corner, the turntable on the component carriage is rotated such that angles of the component housing section with respect to the preceding and following vehicle bodies are adjusted to be equal, thereby minimizing the moving distance of the operators riding on the preceding and following carriages to reach the component.

The work based on the cell production system is also executed in the downstream component mounting work area 103 in the same manner. In the downstream component mounting work area 103, components needed to be mounted on the vehicle body after the engine is mounted, namely, the components that can be mounted only after the engine is mounted are mounted based on the cell production system. Examples of such components are a battery, an air cleaner filter, an engine mount side bracket, an engine fastening bolt, and so on. Further, fuel injection work or oil injection work are executed in the area 103. Furthermore, other components are suitably mounted in the downstream component mounting work area 103.

Next, general operation will be described. A vehicle body 12A finished with coating (coat-finished vehicle body) is transferred from the hanger 92 to the first lifter 82. An underbody harness is set on the vehicle body 12A. Below the first lifter 82, only the workpiece carriage 20 separated from the component carriage 40 is waiting. The vehicle body 12A is transferred to the workpiece carriage 20 by lowering the first lifter 82. A load station 111 to load the vehicle body 12A as the workpiece on the floor panel 22 of the workpiece carriage 20 is disposed below the first lifter 82.

The workpiece carriage 20 loaded with the vehicle body 12A moves forward. A door is removed at a door removing stage 105. The vehicle body without the door is denoted by the reference sign 10B. Further, the removed door is carried by the third overhead conveyer 96. The workpiece carriage 20 moves forward, advances to an entrance of the U-shape conveyance passage 98, and waits at the entrance. On the other hand, a component carriage filled with the components (see FIG. 12) is waiting at the workpiece-only conveyance passage 101.

Then, the component carriages 40 and the workpiece carriages 20 are alternately made to advance to the U-shape conveyance passage 98 in the order, and the component carriage 40 is connected to the preceding workpiece carriage 20f and subsequently the workpiece carriage 20 is connected to the component carriage 40. In this manner, the component carriages 40 and the workpiece carriages 20 are connected bumper-to-bumper. A connect station 112 to connect the floor panel 22 of the workpiece carriage 20 to the carriage upper floor 44 of the component carriage 40 is disposed at an upstream side end portion of the U-shape conveyance passage 98.

Note that the component carriage 40 may be preliminarily connected to the workpiece carriage 20 at the entrance of the U-shape conveyance passage 98, and then the workpiece carriage 20 in such a set state may be connected to the preceding component carriage 40.

In the above-described manner, the plurality of conveying carriage units 10 mutually connected is arranged in series. The conveying carriage unit 10 continuously moves forward at the constant speed on the U-shape conveyance passage 98. Since there is a sufficient distance from the entrance to an exit of the U-shape conveyance passage 98, the components are mounted on the vehicle body 12B during the conveyance. The vehicle body finished with mounting the components is denoted by the reference sign 12C. Since the relative positions between the component housing section and the vehicle body do not change in the upstream component mounting work area 97, the cell production system is executed.

At the exit of the U-shape conveyance passage 98, the head component carriage 40 is separated from the workpiece carriage 20 on which the vehicle body 12C is loaded. Then, the component carriage 40 is returned to the component-only conveyance passage 102. The workpiece carriage 20 is also separated from the following component carriage 40. A release station 113 to release connection between the carriage upper floor 44 of the component carriage 40 (FIG. 4) and the floor panel 22 of the workpiece carriage 20 is disposed at a downstream end portion of the U-shape conveyance passage 98.

The released workpiece carriage 20 is made to advance to below the second lifter 86. The vehicle body 12C is picked up by the second lifter 86, and hung by the hanger 94 of the second overhead conveyer 93. An unload station 114 configured to pick up the vehicle body 12C as the workpiece from the floor panel 22 of the workpiece carriage 20 and unload the same is disposed below the second lifter 86.

The emptied workpiece carriage 20 is returned to the load station 111 below the first lifter 82, passing a workpiece carriage circulation passage 115. Thus, the floor panel 22 of the workpiece carriage 20 is conveyed in a circulating manner along the U-shape conveyance passage 98 and the workpiece carriage circulation passage 115. The workpiece carriage 20 emptied at the unload station 114 is promptly returned to the load station 111, thereby improving productivity.

In the center component mounting work area 104, the components to be mounted on the floor bottom surface of the vehicle body, such as the engine, are mounted on the vehicle body 12C hung by the hanger 94. The second overhead conveyer 93 repeats advancing and stopping operations, but since a component box is fixed on the ground, the line production system is to be executed.

Operation in the downstream component mounting work area 103 is same as the operation in the upstream component mounting work area 97. More specifically, a vehicle body 12D is transferred to the workpiece carriage 20 by the third lifter 87, a vehicle body denoted by a reference sign 12E is completed by mounting the components in the downstream component mounting work area 103.

A vehicle body 12E being lifted is mounted with tires at the fourth lifter 88. A vehicle body 12F being lifted is mounted with a bumper at the fifth lifter 89. Next, a vehicle body 12G is mounted with the door at a door mounting station 106, and made to advance to the inspection process 84.

The number of components needed to be mounted before (or after) the engine is mounted can be increased or reduced by adjusting the projected length of the U-shape conveyance passage 98, 98. Since an apparent line length is determined by the direction of the conveyance passage in the center component mounting work area, the apparent line length is not influenced even though the projected length of the U-shape conveyance passage 98 is increased. Therefore, the apparent line length can be reduced by adopting the U-shape conveyance passage 98.

Next, the component station will be described.

Figure 14:
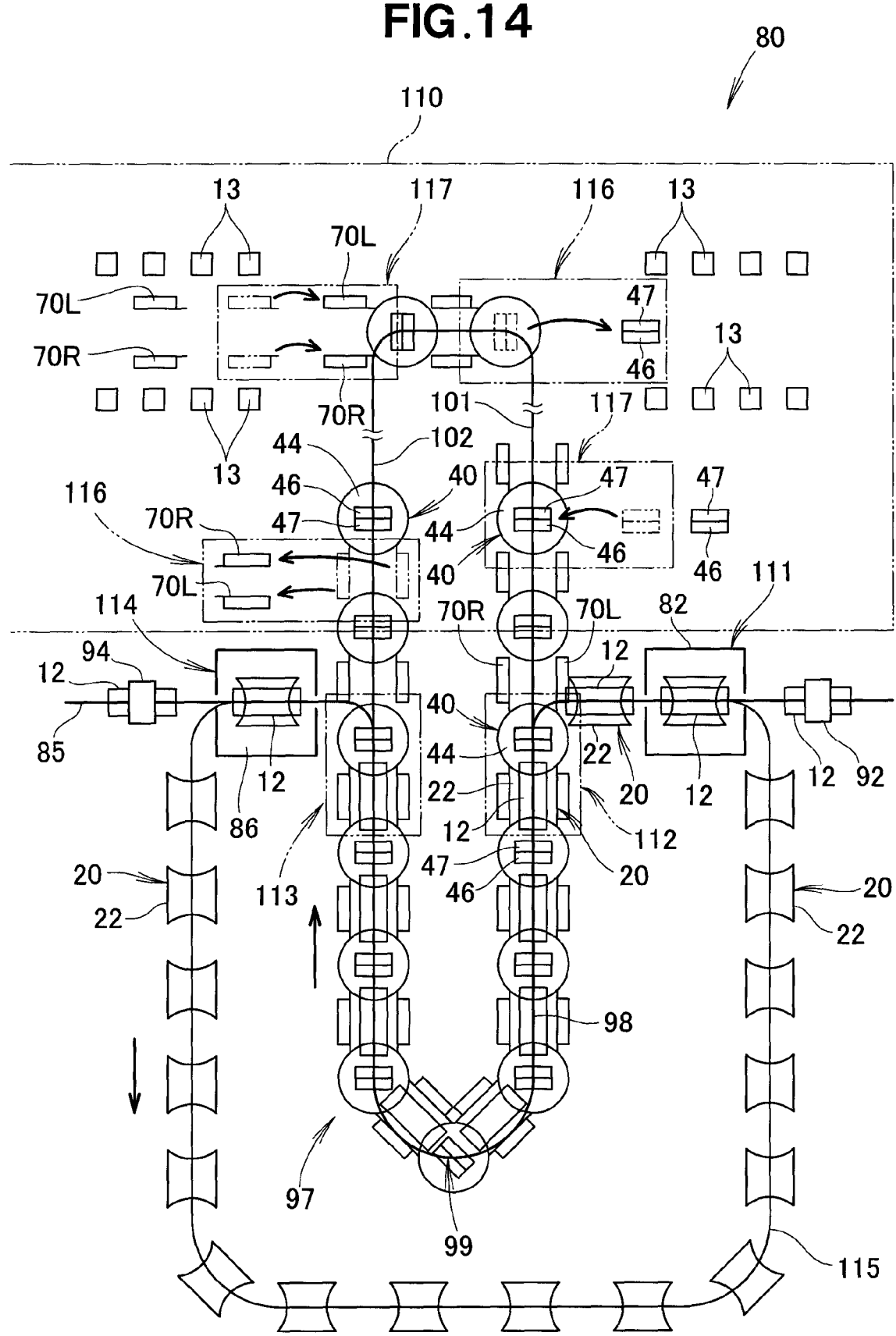
FIG. 14 is an explanatory diagram illustrating the component conveying system illustrated in FIG. 13.

As illustrated in FIG. 14, the component station 110 includes collect stations 116, 116 configured to collect the emptied sub-component carriages 70L, 70R, first component housing section 46, and second component housing section 47 from the component carriage 40, and supply stations 117, 117 configured to supply the sub-component carriages 70L, 70R, first component housing section 46, and second component housing section 47 which are filled with components 13.

The component carriage 40 having connection released at the release station 113 moves along the component-only conveyance passage 102. The emptied sub-component carriages 70L, 70R are removed from the component carriage 40 at the collect station 116 configured to collect the sub-component carriages 70L, 70R. Subsequently, the sub-component carriages 70L, 70R filled with the components 13 are mounted on the component carriage 40 at the supply station 117 configured to supply the sub-component carriages 70L, 70R.

Since the sub-component carriages 70L, 70R are preliminarily filled with the components 13 in a component yard, man-hours for replacing the emptied sub-component carriages 70L, 70R with the sub-component carriages 70L, 70R filled with the components 13 can be saved with respect to the component carriage 40.

After that, the component carriage 40 moves forward and the emptied first component housing section 46 and second component housing section 47 are removed from the carriage upper floor 44 of the component carriage 40 at the collect station 116 configured to collect the first component housing section 46 and second component housing section 47. Then, the first component housing section 46 and second component housing section 47 filled with the components 13 are supplied to the carriage upper floor 44 at the supply station 117 configured to supply the first component housing section 46 and second component housing section 47.

Since the first component housing section 46 and second component housing section 47 are preliminarily filled with the components 13 in the component yard, the man-hours for replacing the emptied first component housing section 46 and second component housing section 47 with the first component housing section 46 and second component housing section 47 filled with the components 13 can be saved with respect to the carriage upper floor 44 of the component carriage 40.

The component carriage 40 having left the component station 110 moves along the component-only conveyance passage 101, and is connected to the workpiece carriage 20 at the connect station 112. Thus, the carriage upper floor 44 of the component carriage 40 is conveyed in a circulating manner along the U-shape conveyance passage 98 and the component-only conveyance passages 101, 102 because the component carriage 40 can be separated from the workpiece carriage 20. Since the component carriage 40 filled with the components 13 is returned to the connect station 112 via the component station 110 which is a different place of the workpiece conveyance passage 85, work efficiency in supplying components 13 and unloading is improved.

Next, a modified example of the component mounting facility 80 illustrated in FIG. 13 will be described.

Figure 15:
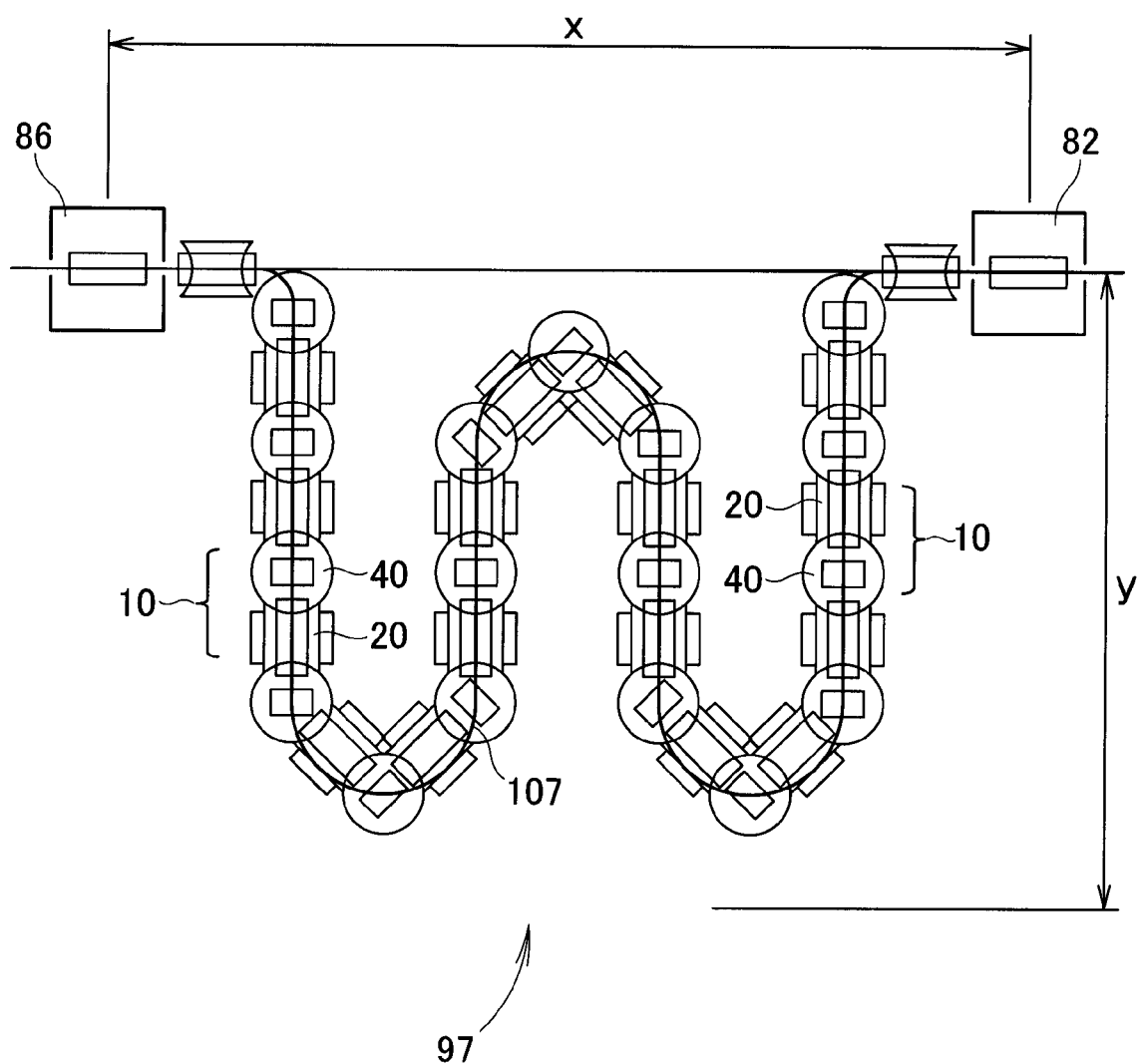
FIG. 15 is a diagram illustrating a modified example of an upstream component mounting work area illustrated in FIG. 13.

As illustrated in FIG. 15, the conveyance passage in the upstream component mounting work area 97 may be W-shaped. By forming the conveyance passage 107 in the W-shape, the larger number of components can be mounted. Further, a projecting length y from the assembly line 85 is shortened although a distance x between the first lifter 82 and the second lifter 86 is elongated. The same shall apply in the downstream component mounting work area 103 (FIG. 13).

The workpiece carriage 20 is a self-traveling carriage including the drive source, but may be moved by being hooked on a chain hook that moves in a circulating manner, or may be moved by being pushed by the operator.

Connection and separation between the workpiece carriage 20 and component carriage 40 and connection and separation between the component carriage 40 and sub-component carriages 70L, 70R may be executed by manually inserting or pulling out a pin. More specifically, use of the overhead conveyer 93 is essential in the center component mounting work area 104, but movement of the carriages 20, 40 in the upstream and downstream component mounting work areas 97, 103 may be any one of self-traveling, traveling by external force, and traveling by hand-pushing.

The conveying carriage unit according to the present invention may convey the vehicle body and also may convey other articles other than the vehicle body. Additionally, the carriage upper floor may be a non-rotational floor laid over the carriage body, and the component housing section may be one housing section without divisions of the first and second component housing sections.

Second Embodiment

Next, a conveying technology according to a second embodiment will be described, and elements same as the conveying technology according to a first embodiment will be described by denoting the elements with same reference signs.

Figure 16:
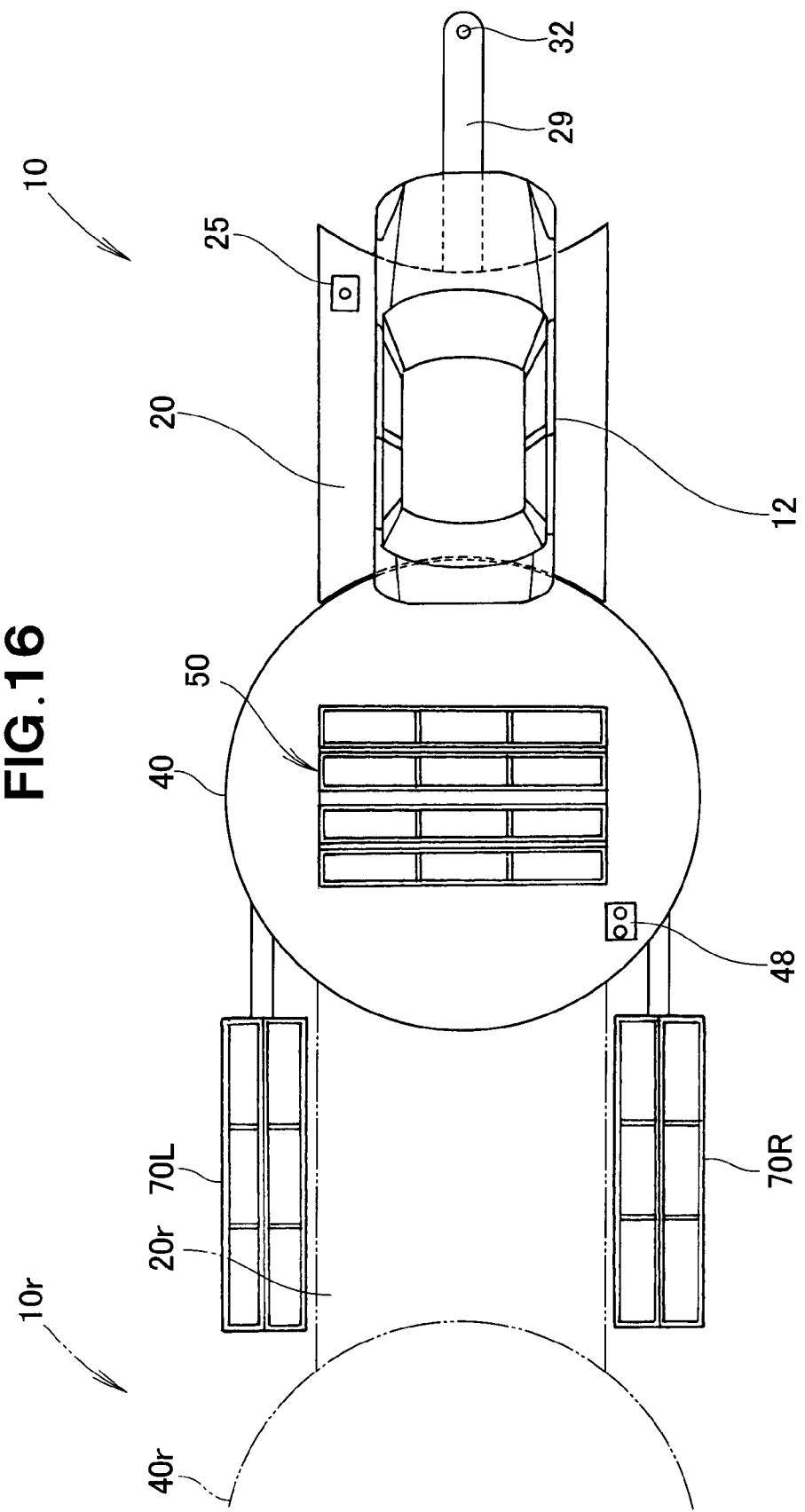
FIG. 16 is a plan view illustrating a conveying carriage unit according to a second embodiment of the present invention.

As illustrated in FIG. 16, conveying carriage unit 10 according to the second embodiment includes a workpiece carriage 20 configured to convey a vehicle body 12 as a workpiece (mounting target), a component carriage 40 disposed adjacent to the workpiece carriage 20, and right and left sub-component carriages 70L, 70R pulled by the component carriage 40 and disposed on the sides of a following workpiece carriage 20r. The reference sign 20r indicated by an imaginary line is the following workpiece carriage, and the reference sign 40r indicated by an imaginary line is a following component carriage. The carriages 20, 40, 70L, and 70R will be individually described in detail.

Figure 17:
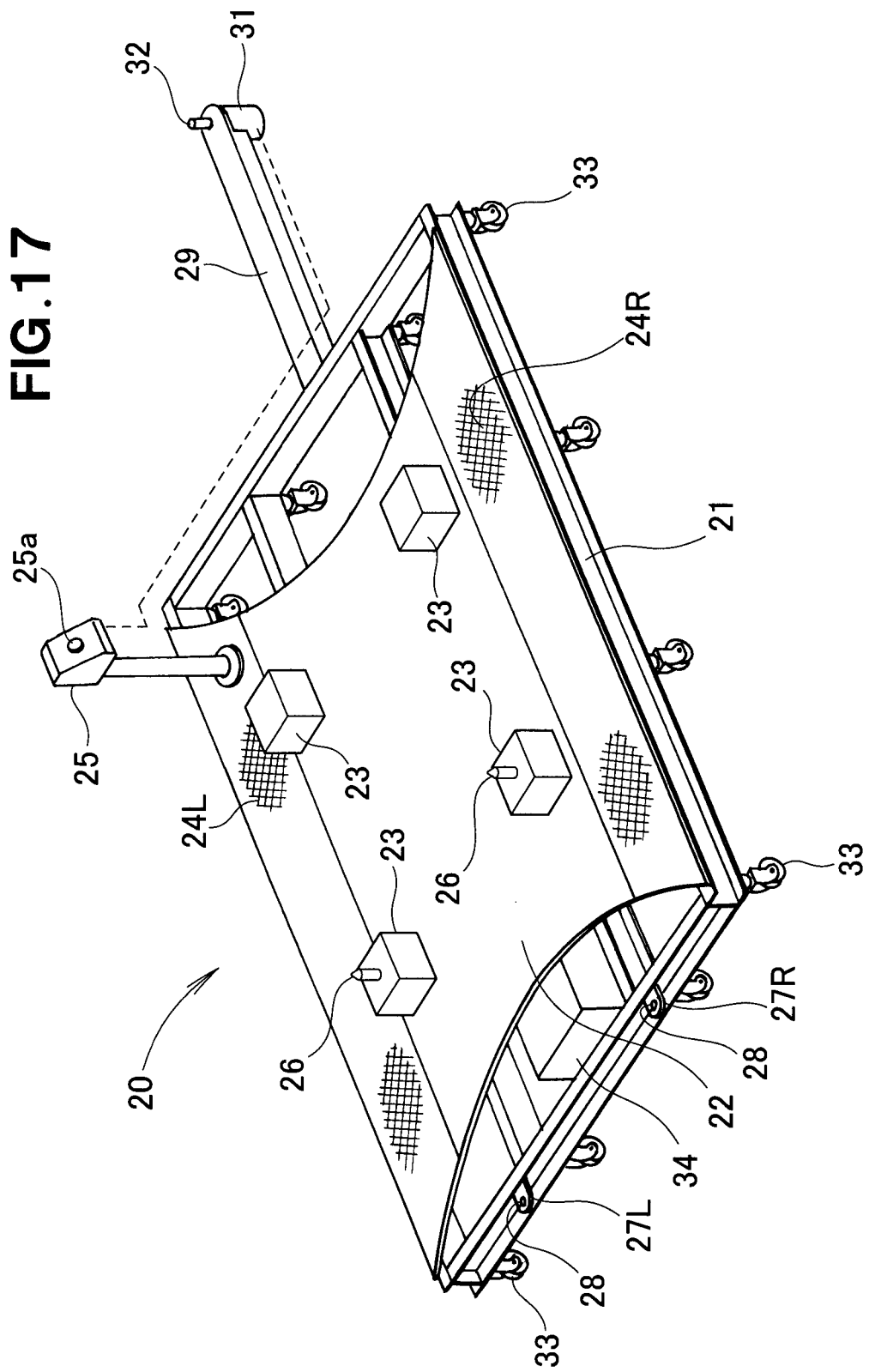
FIG. 17 is a perspective view illustrating a workpiece carriage illustrated in FIG. 16.

As illustrated in FIG. 17, main elements of the workpiece carriage 20 are a frame body 21 formed by assembling steel material in a lattice shape, a floor panel 22 laid over the frame body 21, and four workpiece receiving tables 23 placed on the floor panel 22. A front portion and a rear portion of the floor panel 22 are cut in an arc shape. Additionally, the floor panel 22 includes work floors 24L, 24R applied with non-slip work on right and left side portions thereof. A first operation post 25 is disposed at a front portion of one of the work floors 24L.

Positioning pins 26, 26 are erected on the workpiece receiving bases 23, 23 respectively. The vehicle body 12 (FIG. 1) is positioned in a horizontal direction by these positioning pins 26, 26. Then, the vehicle body 12 is supported by the four workpiece receiving bases 23.

Two right and left eye plates 27L, 27R are provided at a rear portion of the frame body 21. The eye plates 27L, 27R are the plates having open holes 28 respectively. Further, a long arm 29 is extended frontward from a front portion of the frame body 21, and a first locking mechanism 31 is provided at a tip of the long arm 29. The first locking mechanism 31 is, preferably, a cylinder unit having a pin 32 protruded upward. The cylinder unit may be any one of an air cylinder, a hydraulic cylinder, and an electric cylinder. The pin 32 can be vertically moved by operating an operating element 25a of the first operation post 25. The operating element 25a may be any one of a push button, a lever, and a touch sensor, regardless of types.

Figure 18:
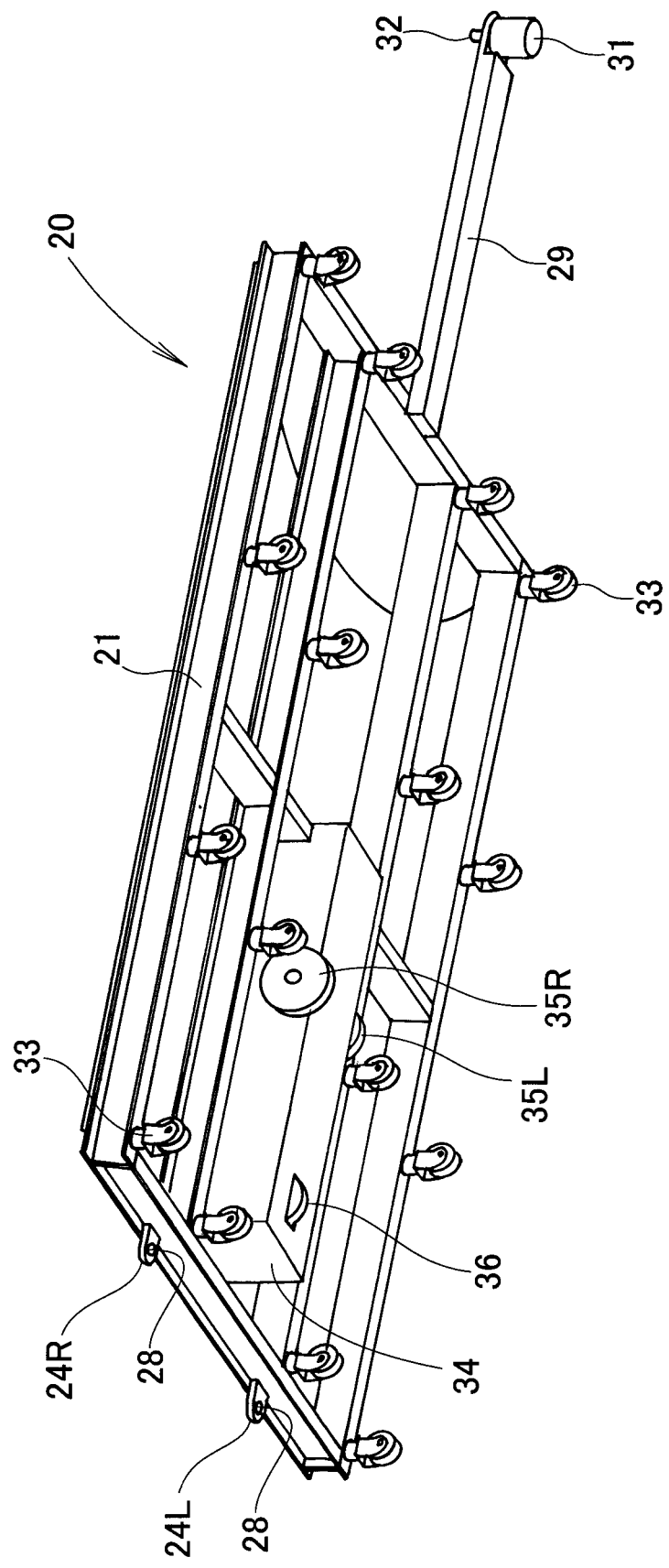
FIG. 18 is a perspective view illustrating the workpiece carriage illustrated in FIG. 16, viewed from a bottom surface.

As illustrated in FIG. 18, a plurality of universal wheels 33 is provided at a lower surface of the frame body 21. The universal wheel 33 is also referred to as a caster, and does not prevent the carriage from turning by the universal wheel itself turning. A drive box 34 is provided at a center of the lower surface of the frame body 21. The drive box 34 includes a motor and a drive source inside thereof, and drive wheels 35L, 35R are driven by the drive source. The drive wheels 35L, 35R contact a track (or road surface) and cause the workpiece carriage 20 to self-travel. Further, a guide wheel 36 is protruded from the drive box 34. The guide wheel 36 plays a role of determining a traffic line of the workpiece carriage 20 by being fitted into a U-shape conveyance passage later described. The guide wheel 36 may be a non-rotational guide shoe.

Figure 19:
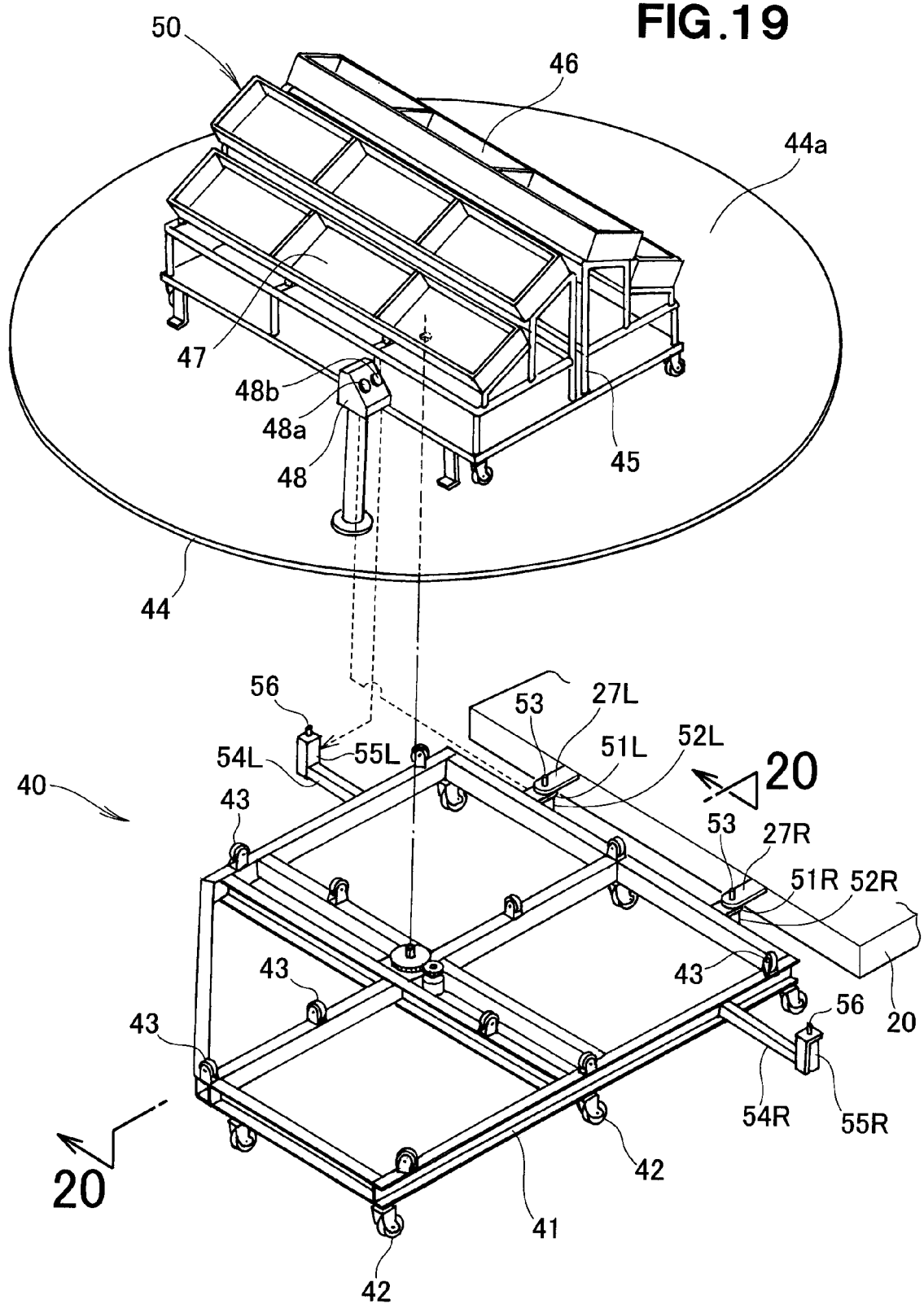
FIG. 19 is an exploded perspective view illustrating a component carriage illustrated in FIG. 16.

As illustrated in FIG. 19, main elements of the component carriage 40 are a carriage body 41 formed by assembling steel material in a lattice shape, a plurality of universal wheels 42 attached to a lower surface of the carriage body 41, a plurality of rollers 43 attached to an upper surface of the carriage body 41, a circular carriage upper floor 44 mounted on the carriage body 41 so as to be placed above the rollers 43, a roof-type frame 45 provided at the carriage upper floor 44, a first component housing section 46 and a second component housing section 47 provided at the roof-type frame 45. The carriage upper floor 44 is provided with a second operation post 48 including two operating elements 48a, 48b.

On the circular carriage upper floor 44, an area surrounding the first component housing section 46 and second component housing section 47 is set as a work floor 44a, and an operator works on this work floor 44a. A component housing section 50 includes the roof-type frame 45, first component housing section 46, and second component housing section 47. The component housing section 50 is detachably provided on the carriage upper floor 44.

Further, plates 51L, 51R are extended frontward from the rear portion of the carriage body 41, and second locking mechanisms 52L, 52R are respectively provided at the plates plates 51L, 51R. The second locking mechanisms 52L, 52R are also, preferably, cylinder units having pins 53 protruded upward. The cylinder unit may be any one of an air cylinder, a hydraulic cylinder, and an electric cylinder. The pins 53, 53 can be vertically moved by operating an operating element 48a of the second operation post 48.

The pins 53, 53 are fitted into the right and left eye plates 27L, 27R on the workpiece carriage 20 side from below, and therefore, the component carriage 40 travels together with the workpiece carriage 20 without laterally swinging and turning.

Also, side arms 54L, 54R are extended from right and left sides of the carriage body 41, and third locking mechanisms 55L, 55R are respectively provided at the side arms 54L, 54R. The third locking mechanisms 55L, 55R are also, preferably, cylinder units having pins 56, 56 protruded upward. The cylinder unit may be any one of an air cylinder, a hydraulic cylinder, and an electric cylinder. The pins 56, 56 can be vertically moved by operating an operating element 48b of the second operation post 48.

Figure 20:
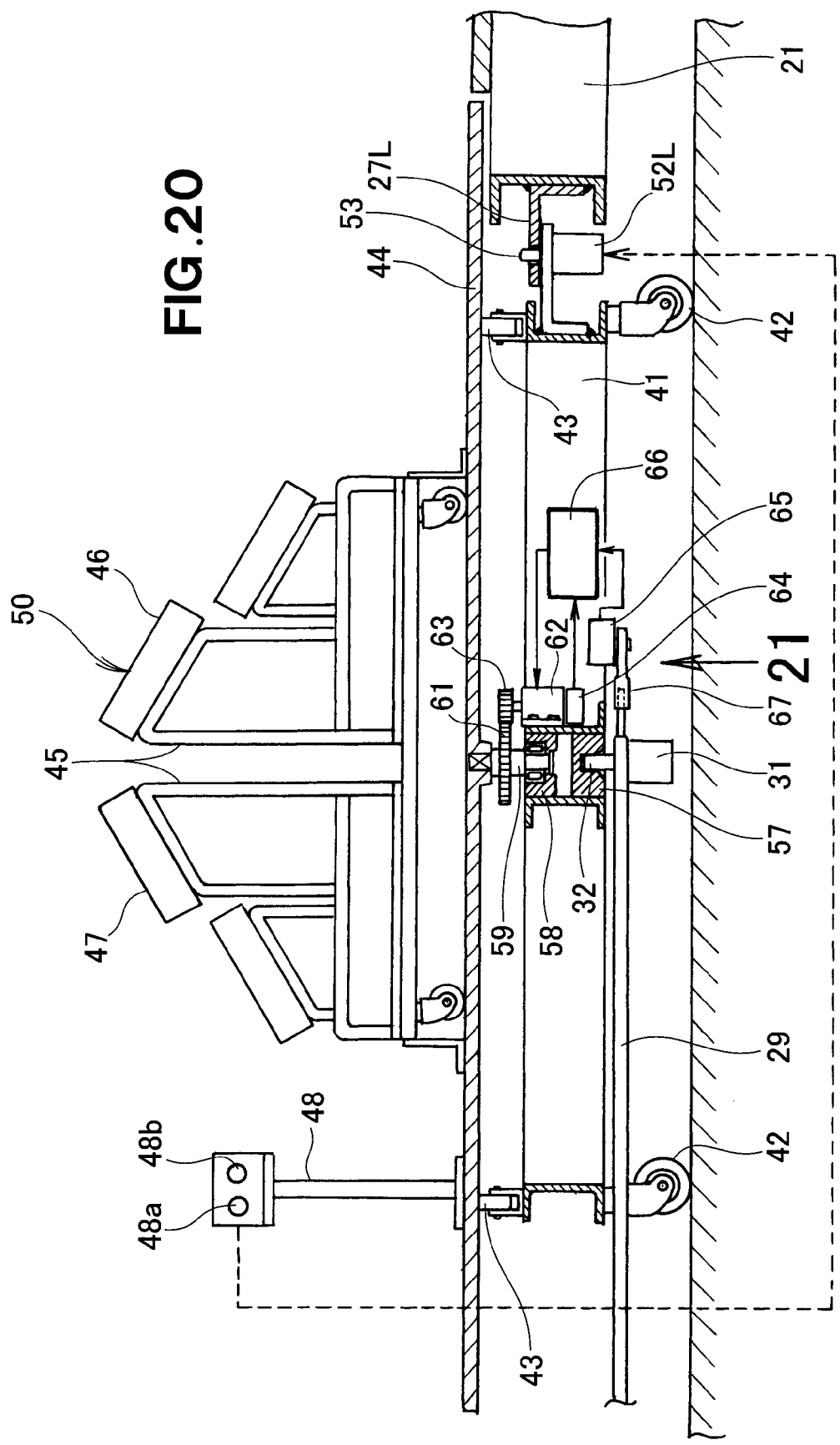
FIG. 20 is a cross-sectional view taken along a line 20-20 in FIG. 19.

As illustrated in FIG. 20, a perforated plate 57 is provided at a lower center portion, and a shaft bearing block 58 is provided at an upper center portion of the carriage body 41. A center shaft 59 is extended downward from a center of the carriage upper floor 44, and a tip of the center shaft 59 is fitted into the shaft bearing block 58. Since the carriage upper floor 44 is supported by the plurality of rollers 43, no downward load is applied to the shaft bearing block 58. The shaft bearing block 58 exerts an effect of guiding the center shaft 59 in a rotatable manner.

A driven gear 61 is provided halfway at the center shaft 59. A servo motor 62 is disposed near the driven gear 61, and the driven gear 61 is rotated by a drive gear 63 driven by the servo motor 62. As a result, the carriage upper floor 44 horizontally turns around the center shaft 59. In other words, the carriage upper floor 44 is a turntable.

The servo motor 62 is provided with an encoder 64 configured to detect a rotation angle and a rotary direction of a motor center shaft 59. Further, the carriage body 41 is provided with a rotary sensor 65 and a rotation angle control section 66 in addition to the servo motor 62. Operation of the rotary sensor 65 will be described later. Note that angle information from the rotary sensor 65 and angle information from the encoder 64 are input to the rotation angle control section 66. The rotation angle control section 66 controls the servo motor 62 based on the angle information.

Figure 21:
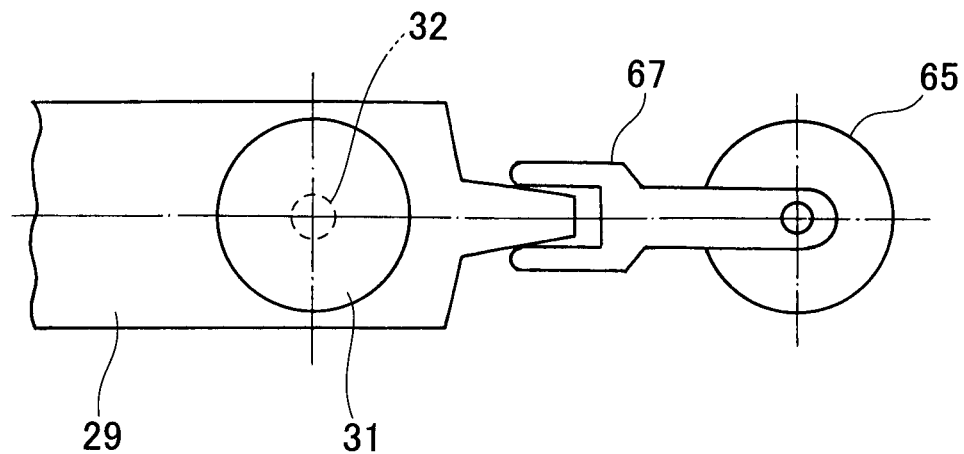
FIG. 21 is a diagram viewed from an arrow 21 in FIG. 20.

As illustrated in FIG. 21, the tip of the long arm 29 is fitted into a fork-shaped arm 67 extending from the rotary sensor 65. In the drawing, the fork-shaped arm 67 is not tilted because the long arm 29 is not tilted.

Figure 22:
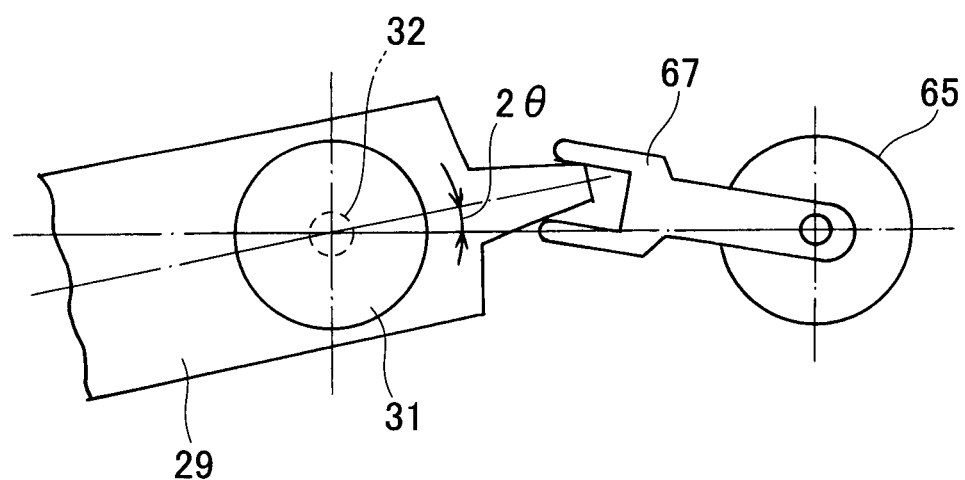
FIG. 22 is a diagram illustrating operation of a rotary sensor illustrated in FIG. 21.

As illustrated in FIG. 20, the long arm 29 is horizontally rotatable around the pin 32 of the first locking mechanism 31. As a result, the long arm 29 may rotate around the pin 32 by only an angle 2θ as illustrated in FIG. 22. The rotation angle 2θ is detected by the rotary sensor 65.

As illustrated in FIG. 23(a), the vehicle body 12 is placed in front of the component carriage 40 and further a following vehicle body 12r is placed in back of the component carriage 40. As shown by the arrow (1), a component is taken out from the first component housing section 46 and mounted on the vehicle body 12. Also, as shown by the arrow (2), a component is taken out from the second component housing section 47 and mounted on the following vehicle body 12r.

In the case where the following workpiece carriage 20r is turned by the angle 2θ with respect to the workpiece carriage 20, the carriage upper floor 44 is rotated by the angle θ as illustrated in FIG. 23(b). This operation is executed by the rotation angle control section 66 (FIG. 20).

As a result, rotation of the turntable (carriage upper floor 44) is controlled by the rotation angle control section 66 such that a distance L from the first component housing section 46 to the vehicle body 12 becomes substantially equal to a distance Lr from the second component housing section 47 to vehicle body 12r (describing in terms of the angle, the angles of the component housing section with respect to the preceding and following vehicle bodies become equal). By controlling rotation of the turntable (carriage upper floor 44), work efficiency related to the first component housing section 46 and work efficiency related to the second component housing section 47 are equalized. As a result, component mounting work can be leveled.

More specifically, as illustrated in FIG. 23(a), conveyance is continuously executed at a constant speed without stop in normal operation. As illustrated in FIG. 23(b), when coming at a corner, the turntable on the component carriage is rotated such that the angles of the component housing section with respect to the preceding and following vehicle bodies are adjusted to be equal, thereby minimizing the moving distance of the operators riding on the preceding and following carriages to reach the component.

A turning center of the conveying carriage unit 10 is the pin 32 illustrated in FIG. 20. The turning center and rotary center (center shaft 59) of the turntable (carriage upper floor 44) is the same axis. More specifically, since the turning center of the conveying carriage unit and the rotary center of the turntable are the same axis, relative positions of the component housing sections 46, 47 with respect to the vehicle body 12 are easily controlled.

Figure 24:
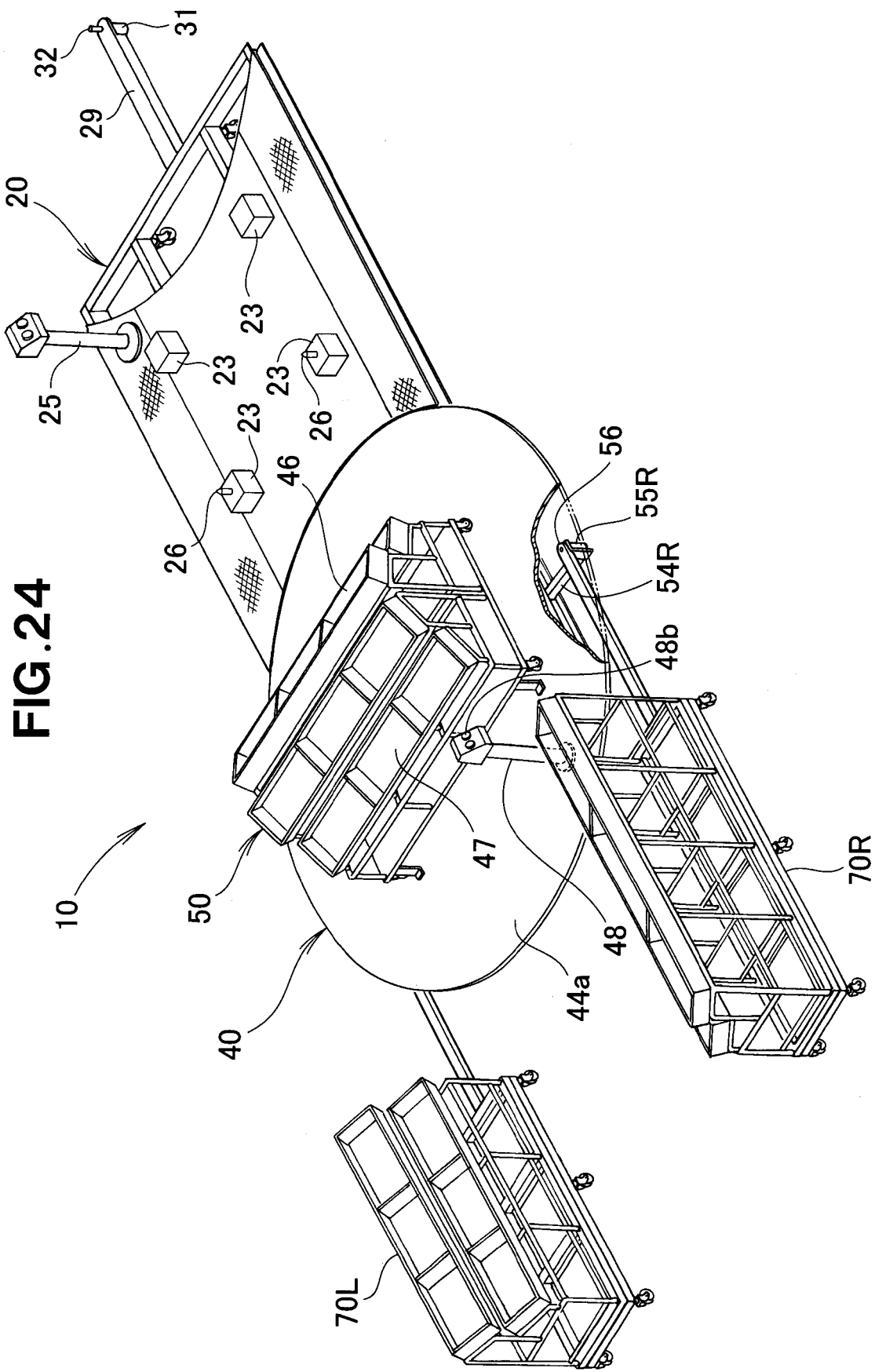
FIG. 24 is a perspective view illustrating the conveying carriage unit illustrated in FIG. 16.

As illustrated in FIG. 24, the right and left sub-component carriages 70L, 70R are pulled by the component carriage 40. A pin 56 of the third locking mechanism 55R can be moved down by operating the operating element 48b provided at the second operation post 48. As a result, the right sub-component carriage 70R is separated from the component carriage 40. The left sub-component carriage 70L can be separated in the same manner. By operating the operating element 48b, connecting the right and left sub-component carriages 70L, 70R to the component carriage 40 and separating the right and left sub-component carriages 70L, 70R from the component carriage 40 can be optionally executed.

In FIG. 16, the right and left sub-component carriages 70L, 70R are additionally connected to the component carriage 40, and the left sub-component carriage 70L is placed on the left side of the workpiece carriage 20r and the right sub-component carriage 70R is placed on the right side of the workpiece carriage 20r. The moving distance of the component can be shortened, thereby improving operating efficiency.

However, the sub-component carriages 70L, 70R can be omitted. Therefore, the necessary elements of the conveying carriage unit 10 are the workpiece carriage 20 and the component carriage 40 placed in back of the workpiece carriage 20. The component carriage 40 may also be placed in front of the workpiece carriage 20r of a following conveying carriage unit 10r as illustrated by the imaginary line in FIG. 16. Therefore, the component carriage 40 is placed in front and back of the workpiece carriage 20.

More specifically, in FIG. 16, the conveying carriage unit 10 includes the workpiece carriage 20 configured to convey the workpiece (vehicle body 12), and the component carriage 40 disposed in back of the workpiece carriage 20, also connected to the workpiece carriage 20 in a separable manner and configured to convey the components. The conveying carriage unit is connected to preceding and following conveying carriage units in a turnable manner as illustrated in FIG. 23.

Since the workpiece carriage 20 and the component carriage 40 are connectable, the workpiece carriage 20 and the component carriage 40 can be continuously conveyed. The operator can work while riding on the component carriage 40 or workpiece carriage 20. Since there is no need to stop the workpiece carriage 20 for a long time, the production time is kept constant.

Further, the conveying carriage unit 10 is connected to the preceding and following conveying carriage units 10 in a turnable manner, and therefore, a conveying traffic line can be meandered. A length of the conveying traffic line can be elongated by such meandering, and expansion of an assembly work area can be avoided.

Moreover, one of the workpiece carriage 20 and the component carriage 40 is made to self-travel, thereby achieving to move the other one integrally. Consequently, the operator does not need to manually push the carriage, and a heavy article such as the vehicle body can be conveyed.

A vehicle body component mounting system adopted with the above-described conveying carriage unit 10 will be described below. The component mounting facility 80 for operating the vehicle body component mounting system is illustrated in FIG. 27. A description will be first provided for each of categories extracted in FIGS. 25 and 26 since the facility configuration is complex.

Arrangement of the coating process, lifters, a discharge line, an assembly line is same as the embodiment illustrated in FIG. 10.

Figure 25:
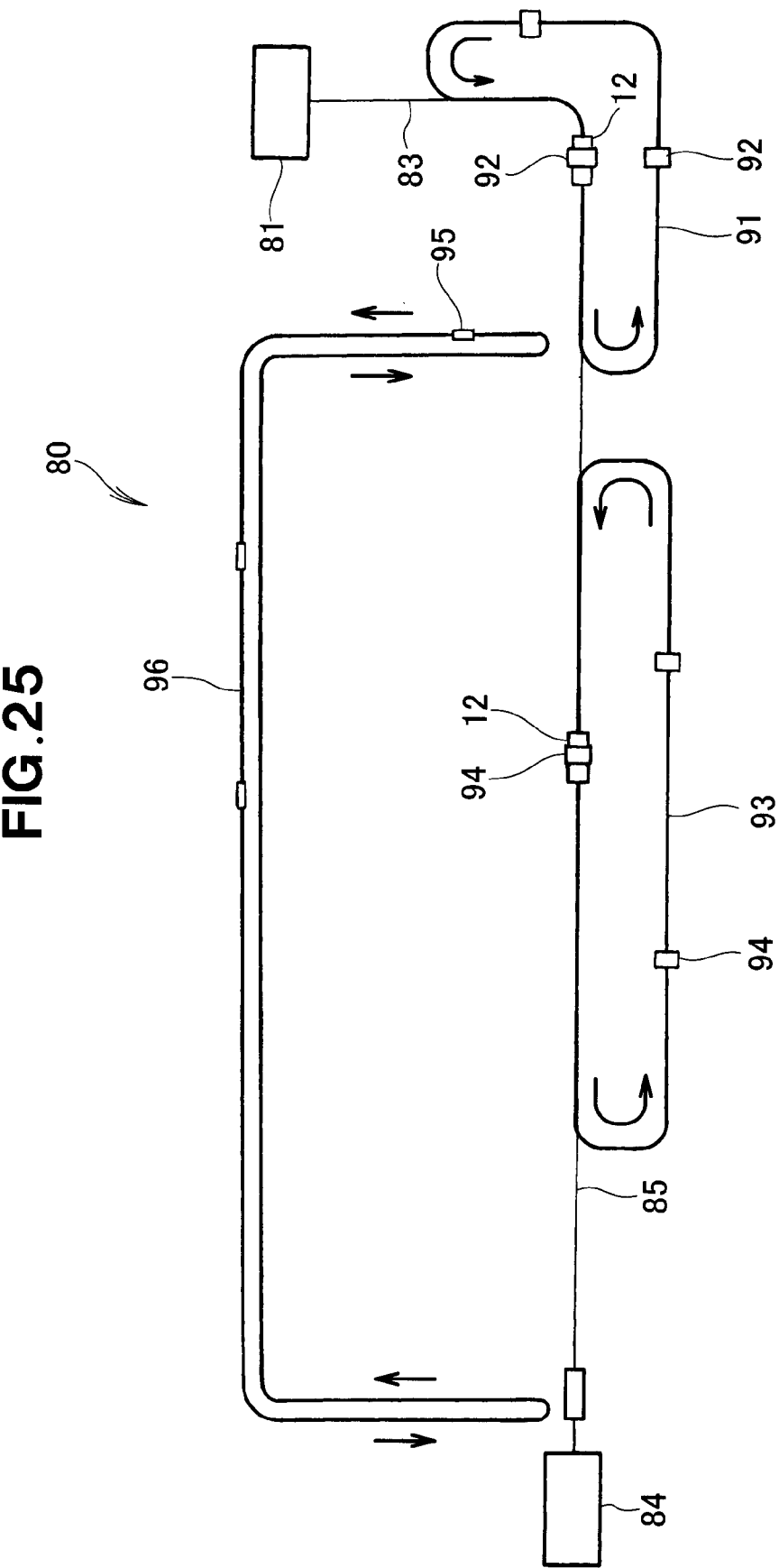
FIG. 25 is a diagram illustrating arrangement of overhead conveyers selected from the component mounting facility.

FIG. 25 is a diagram illustrating arrangement of overhead conveyers, and a first overhead conveyer 91 is arranged along the discharge line 83. The vehicle body 12 finished with coating is hung by a hanger 92 of the first overhead conveyer 91 and carried to above the first lifter 82 (FIG. 10).

Further, a second overhead conveyer 93 is arranged along the assembly line 85. The second overhead conveyer 93 conveys the vehicle body being hung by the hanger 94, and components to be mounted on the floor bottom surface of the vehicle body, such as an engine, are mounted on the vehicle body 12 while being conveyed.

Additionally, a third overhead conveyer 96 is provided, whereby a door 95 is received between the first overhead conveyer 91 and the second overhead conveyer 93, a window regulator or the like is built in the door 95, and the door is transferred to an entrance side of the inspection process 84.

Figure 26:
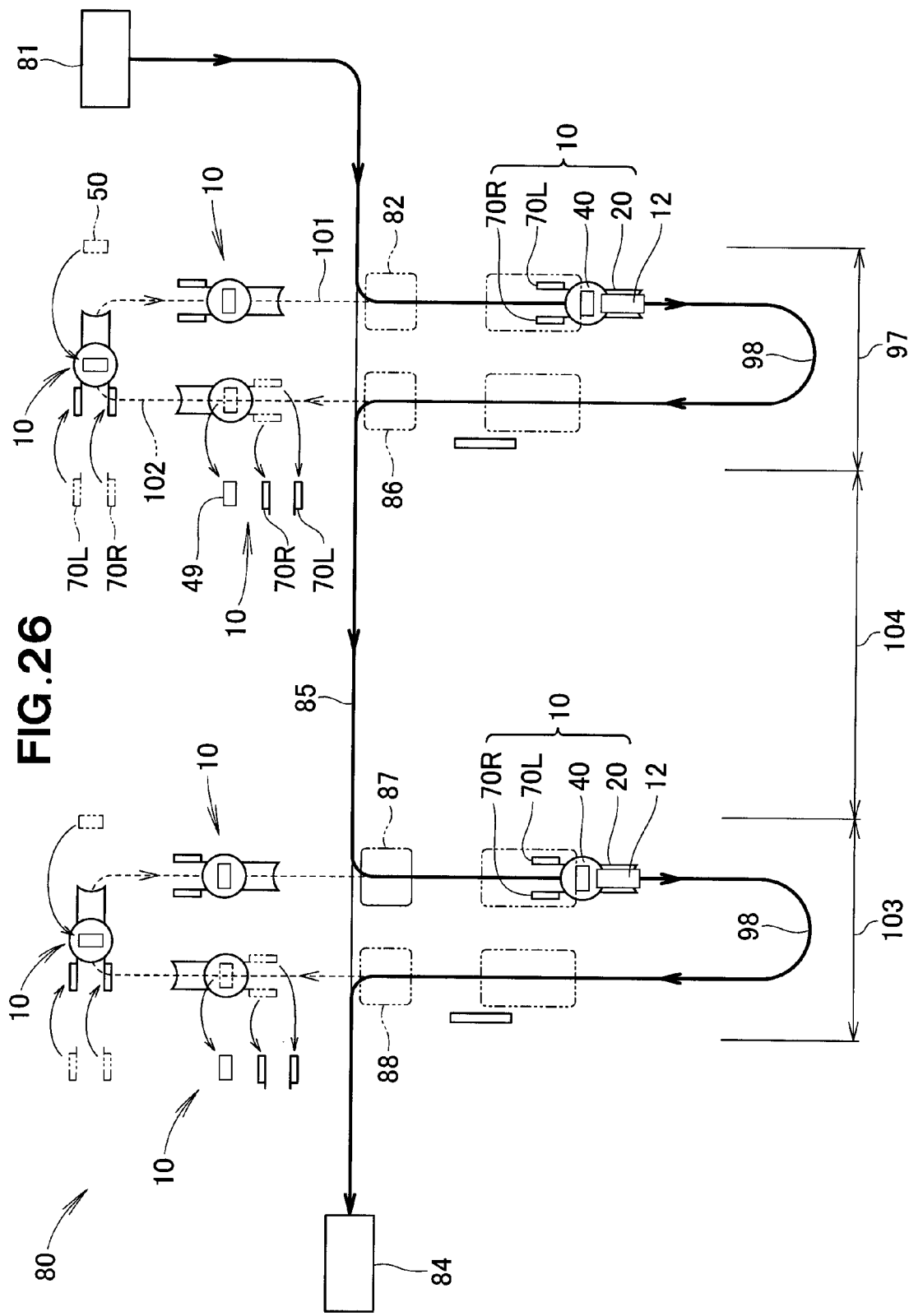
FIG. 26 is a diagram illustrating arrangement of workpiece conveyance passages selected from the component mounting facility.
Figure 27:
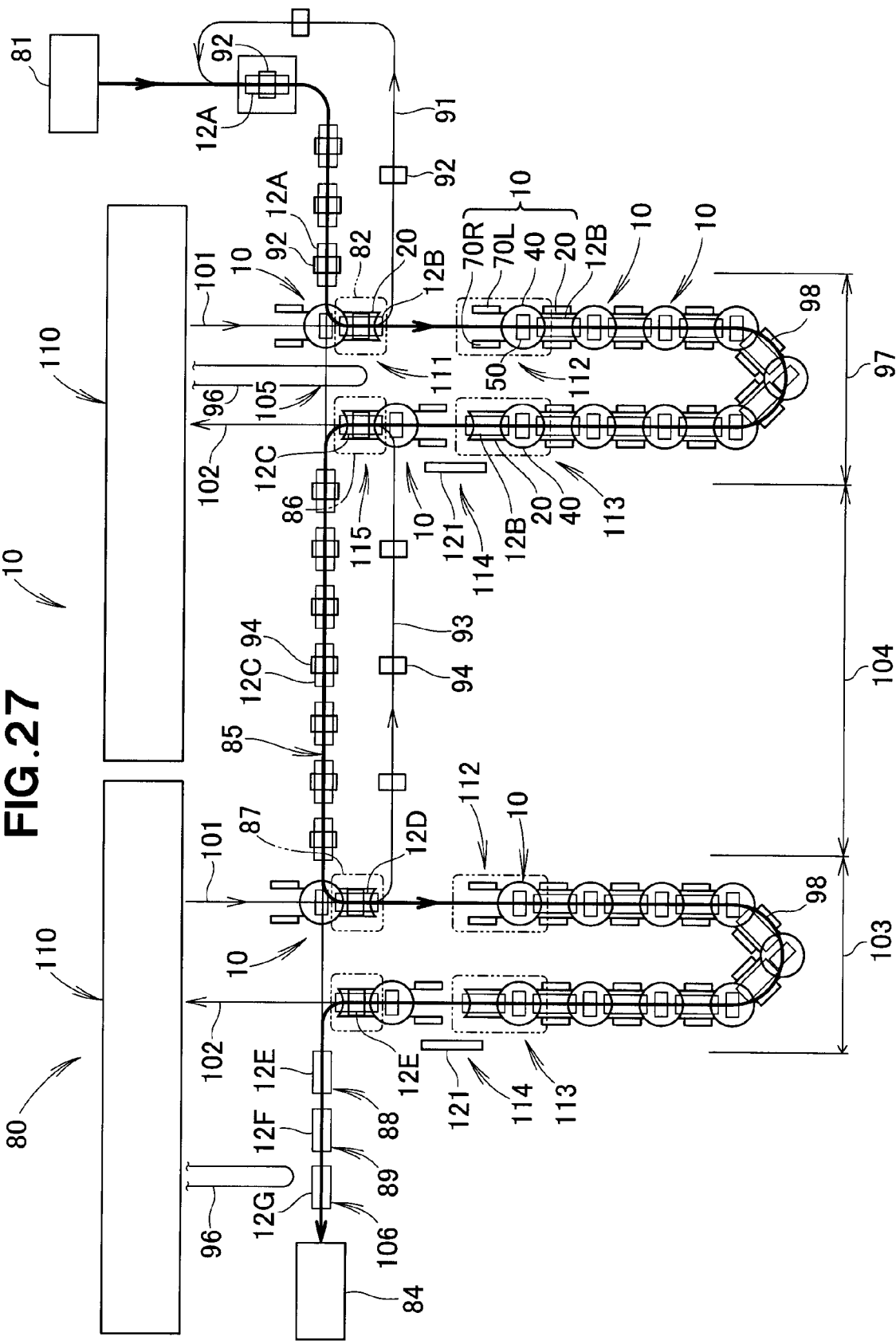
FIG. 27 is a diagram illustrating a detail plan of the component mounting facility.

FIG. 26 is a diagram illustrating arrangement of upstream and downstream component mounting work areas, the upstream component mounting work area 97 is positioned between the first lifter 82 and the second lifter 86, and a U-shape conveyance passage 98 orthogonally or obliquely projected in a lateral direction from the assembly line 85 is disposed between the first lifter 82 and the second lifter 86. The conveying carriage unit 10 on which the vehicle body 12 is loaded moves along the U-shape conveyance passage 98. Additionally, component-only conveyance passages 101, 102 indicated by a dash line are connected at a leg portion of the U-shape conveyance passage 98, and the conveying carriage unit 10 filled with the components is fed to the U-shape conveyance passage 98 from the component-only conveyance passage 101. Further, the emptied conveying carriage unit 10 is sent back to the component-only conveyance passage 102 from the U-shape conveyance passage 98. Note that the sub-component carriages 70L, 70R are pulled by the component carriage 40 of the conveying carriage unit 10.

Additionally, a downstream component mounting work area 103 is positioned between the third lifter 87 and the fourth lifter 88, and the U-shape conveyance passage 98 projecting sideways from the assembly line 85 is disposed between the third lifter 87 and the fourth lifter 88. A description for others will be omitted for being same as the upstream component mounting work area 97.

A center component mounting work area 104 is positioned between the second lifter 86 and the third lifter 87, and components to be mounted on the floor bottom surface of the vehicle body, such as the engine, are mounted in the center component mounting work area 104.

The component mounting facility 80 illustrated in FIG. 27 is formed by combining the above-described configurations. The component mounting facility 80 includes the upstream component mounting work area 97, center component mounting work area 104, and downstream component mounting work area 103.

In the center component mounting work area 104, the components to be mounted on the floor bottom surface of the vehicle body, such as the engine, are mounted on a vehicle body 12C to be conveyed while being hung at the second overhead conveyer 93. More specifically, the components mounted in the work area are an engine front suspension assembly (assembly preliminarily assembled with constituting components of the engine and a front suspension), a rear suspension assembly (assembly preliminarily assembled with constituting components of the rear suspension), and other components to be mounted on the floor bottom surface of the vehicle body (components that can be mounted to the vehicle body only in a upward moving state). Further, the engine front suspension assembly and rear suspension assembly are respectively conveyed to a mounting station in an assembled state, and lifted by an automatic mounting machine from below the vehicle body, and fastened with a bolt in a docked state with the vehicle body. In the work area, stop-and-go conveyance is executed at least in this station.

In the upstream component mounting work area 97, components needed to be mounted on the vehicle body before the engine is mounted, namely, the components that cannot be mounted after the engine is mounted are mounted based on the cell production system. Examples of such components are members to be mounted on an engine room wall surface (e.g., a radiator, a pedal assembly, a steering column, a brake hose, etc.). Additionally, other components are suitably mounted in the upstream component mounting work area 97.

More specifically, in the upstream component mounting work area 97, a plurality of operators ride on one conveying carriage, and the components are mounted during the time of conveyance from a start point to an end point of this work area. This work corresponds to the work based on a cell production system. In the normal operation, conveyance is continuously executed at a constant speed without stop. When coming at a corner, the turntable on the component carriage is rotated such that the angles of the component housing section with respect to the preceding and following vehicle bodies are adjusted to be equal, thereby minimizing the moving distance of the operators riding on the preceding and following carriages to reach the component.

The work based on the cell production system is also executed in the downstream component mounting work area 103 in the same manner. In the downstream component mounting work area 103, components needed to be mounted on the vehicle body after the engine is mounted, namely, the components that can be mounted only after the engine is mounted are mounted based on a cell production system. Examples of such a component are a battery, an air cleaner filter, an engine mount side bracket, an engine fastening bolt, and so on. Further, fuel injection work or oil injection work are executed in the area 103. Furthermore, other components are suitably mounted in the downstream component mounting work area 103.

Next, general operation will be described.

A coating-finished vehicle body 12A is moved to the first lifter 82 from the hanger 92. An underbody harness is set on the vehicle body 12A. The workpiece carriage 20 of the conveying carriage unit 10 filled with the components is waiting below the first lifter 82.

The vehicle body 12A is transferred to the workpiece carriage 20 by lowering the first lifter 82. Further, the place where the first lifter 82 is arranged is a vehicle body load station 111 whereby the vehicle body 12A is loaded on the conveying carriage unit 10.

A door is removed at a door removing stage 105. The vehicle body without the door is denoted by a reference sign 12B. The vehicle body 12B is loaded on the workpiece carriage 20 and the conveying carriage unit 10 moves forward. Further, the removed door is carried by the third overhead conveyer 96. The conveying carriage unit 10 advances to a connect station 112 whereby the conveying carriage units 10 are mutually connected. The conveying carriage unit 10 having advanced is connected to a rear portion of the preceding conveying carriage unit 10 already waiting at the connect station 112.

More specifically, the workpiece carriage 20 of the advancing conveying carriage unit 10 is connected to the preceding component carriage 40 of the conveying carriage unit 10 already waiting. In the same manner as connecting the component carriage 40 to the workpiece carriage 20, a plurality of conveying carriage units 10 is connected bumper-to-bumper.

In the above-described manner, the plurality of mutually connected conveying carriage units 10 is arranged in series. The conveying carriage unit 10 continuously moves forward at the constant speed on the U-shape conveyance passage 98. Since there is a sufficient distance from the entrance to an exit of the U-shape conveyance passage 98, the components are mounted on the vehicle body 12B during the conveyance.

The conveying carriage unit 10 advances to a connection release station 113 immediately before the exit of the U-shape conveyance passage 98. In the connection release station 113, the preceding conveying carriage unit 10 is separated. The following conveying carriage unit 10 has a side of the workpiece carriage 20 opened. The following conveying carriage unit 10 having the side opened is also sequentially separated.

An equipment mount station 114 whereby equipment is mounted on the vehicle body 12B is disposed between the connection release station 113 and the second lifter 86. In the equipment mount station 114, an assist device 121 configured to lift relatively heavy equipment such as a sheet is disposed.

The conveying carriage unit 10 separated at the connection release station 113 advances to the equipment mount station 114. The equipment such as the sheet is lifted by the assist device 121, and the equipment is mounted on the vehicle body 12B from the side of the workpiece carriage 20. The vehicle body finished with mounting the components and equipment is denoted by the reference sign 12C. Since the relative positions between the component housing section and the vehicle body do not change in the upstream component mounting work area 97, the cell production system is executed.

The conveying carriage unit 10 loaded with the vehicle body 12C is advanced to below the second lifter 86. The vehicle body 12C is picked up by the second lifter 86, and hung by the hanger 94 of the second overhead conveyer 93. Further, the place where the second lifter 86 is arranged is a vehicle body discharge station 115 whereby the vehicle body 12C is discharged from the conveying carriage unit 10.

The emptied conveying carriage unit 10 is advanced to the component-only conveyance passage 102. The component-only conveyance passage 102 is connected to the component station whereby the components are loaded on the emptied conveying carriage unit 10.

In the center component mounting work area 104, the components to be mounted on the floor bottom surface of the vehicle body, such as the engine, are mounted on the vehicle body 12C hung by the hanger 94. The second overhead conveyer 93 repeats advancing and stopping operations, but since a component box is fixed on the ground, the line production system is to be executed.

Operation in the downstream component mounting work area 103 is same as the upstream component mounting work area 97. More specifically, a vehicle body 12D is transferred to the workpiece carriage 20 by the third lifter 87, a vehicle body denoted by a reference sign 12E is completed by mounting the components at the downstream component mounting work area 103.

A vehicle body 12E being lifted is mounted with tires at the fourth lifter 88. A vehicle body 12F being lifted is mounted with a bumper at the fifth lifter 89. Next, a vehicle body 12G is mounted with the door at a door mounting station 106, and made to advance to the inspection process 84.

The number of components needed to be mounted before (or after) the engine is mounted can be increased or reduced by adjusting the projected length of the U-shape conveyance passages 98, 98. Since an apparent line length is determined by the direction of the conveyance passage in the center component mounting work area, the apparent line length is not influenced even though the projected length of the U-shape conveyance passage 98 is elongated. Therefore, the apparent line length can be shortened by adopting the U-shape conveyance passage 98.

Figure 28:
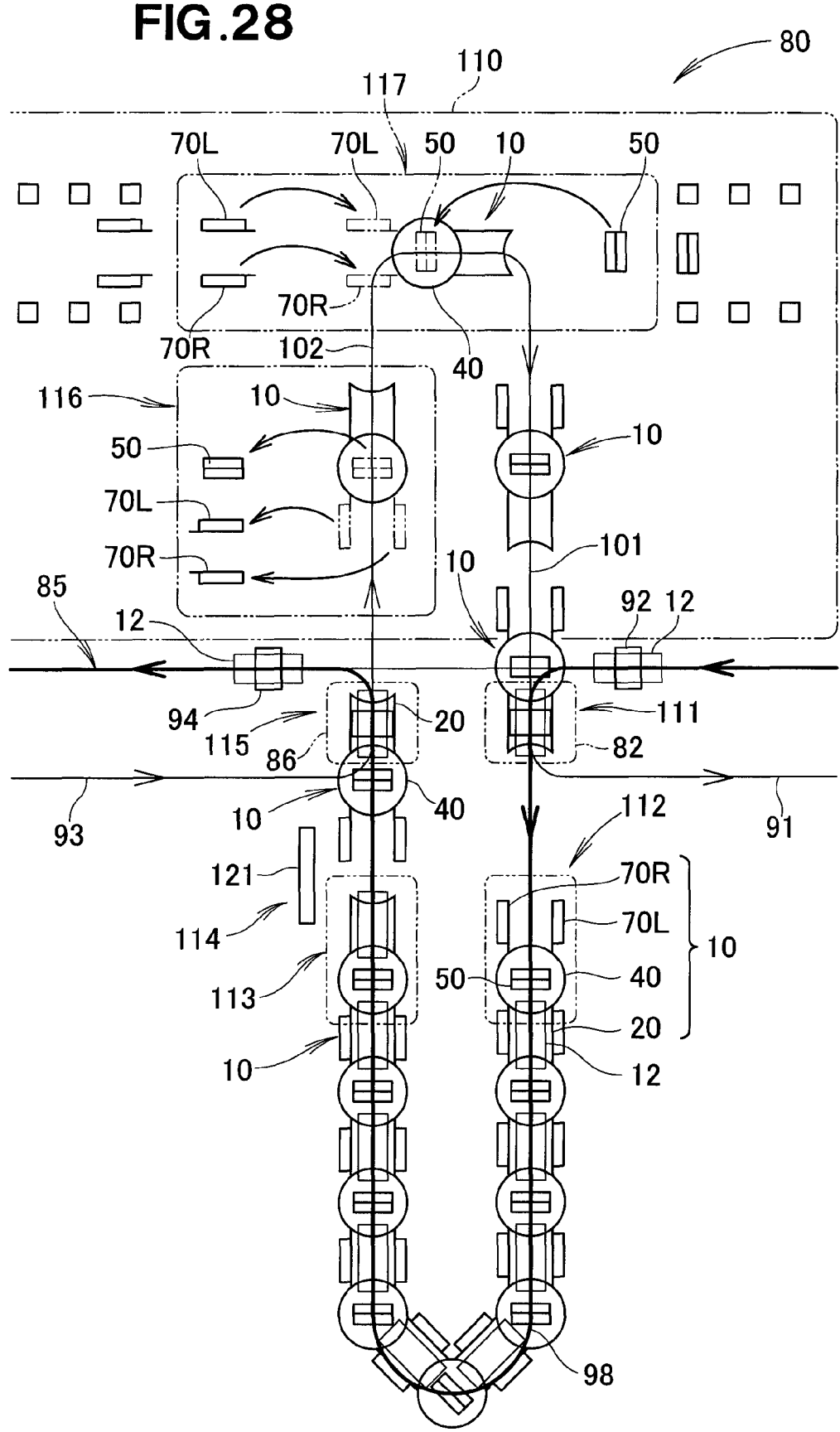
FIG. 28 is an explanatory diagram illustrating the component conveying system illustrated in FIG. 27.

Next, the component station will be described. As illustrated in FIG. 28, the component station 110 includes a collect station 116 configured to collect the emptied component housing section 50 and right and left sub-component carriages 70L, 70R from the conveying carriage unit 10, and supply stations 117, 117 configured to supply the component housing section 50 and sub-component carriages 70L, 70R filled with the components to the conveying carriage unit 10.

The conveying carriage unit 10 from which the vehicle body 12 is discharged at the vehicle body discharge station 115 advances to the component-only conveyance passage 102. The emptied component housing section 50 and sub-component carriages 70L, 70R are removed from the component carriage 40 at the collect station 116. The conveying carriage unit 10 moves along the component-only conveyance passage 102, and the component housing section 50 filled with the components is loaded on the component carriage 40 at the supply station 117, and then the sub-component carriages 70L, 70R filled with the components are connected to the component carriage 40.

Since the component housing section 50 and the sub-component carriages 70L, 70R are preliminarily filled with the components in a component yard, man-hours for replacing the emptied component housing section 50 and sub-component carriages 70L, 70R with the component housing section 50 and sub-component carriages 70L, 70R filled with the components 13 can be saved with respect to the component carriage 40.

The conveying carriage unit 10 having left the supply station 117 moves to the component-only conveyance passage 101, and the vehicle body 12 is loaded on the vehicle body load station 111. Thus, while the workpiece carriage 20 and component carriage 40 are integrally connected, the vehicle body 12 can be loaded and discharged and further the component housing section 50 and sub-component carriages 70L, 70R can be collected and connected, thereby achieving to improve productivity.

Moreover, only one passage is necessary for the conveying carriage unit 10 in the upstream component mounting area, thereby achieving to reduce the facility cost.

Figure 29:
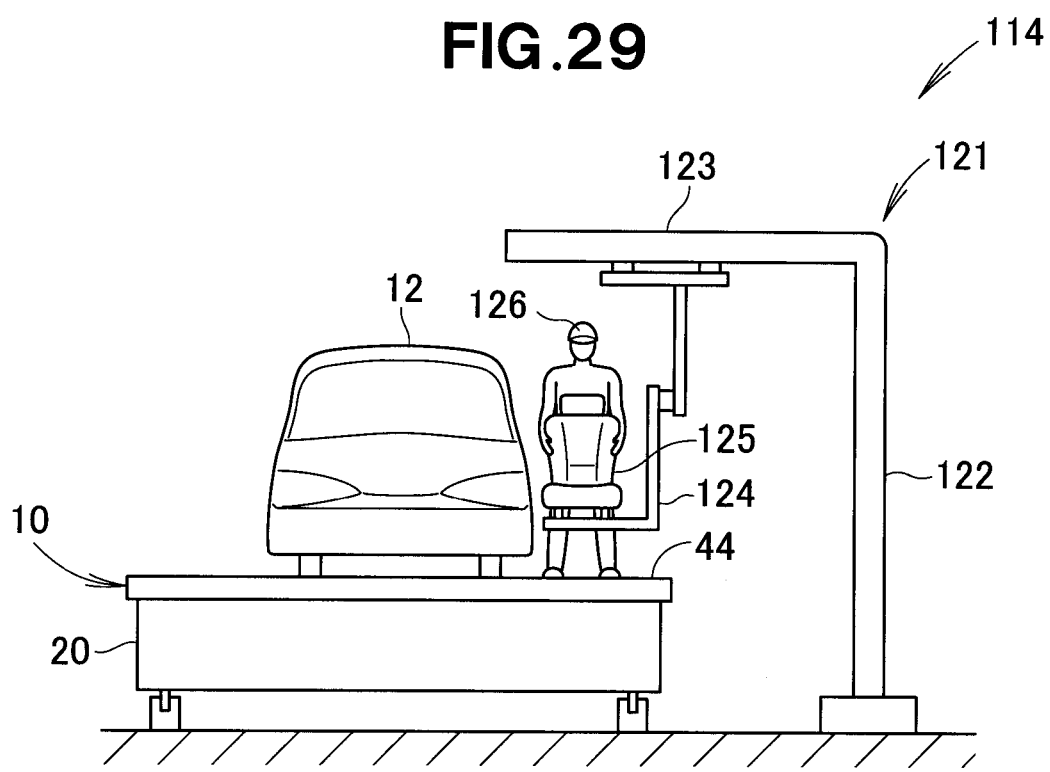
FIG. 29 is a diagram illustrating operation of an assist device.

Next, operation of the assist device will be described. As illustrated in FIG. 29, the assist device 121 is disposed at the equipment mount station 114. The assist device 121 includes a support pillar 122, a beam portion 123 disposed at an upper portion of the support pillar 122, and an equipment supporting portion 124 movably disposed at the beam portion 123.

In the equipment mount station 114, the conveying carriage unit 10 has the side of the workpiece carriage 20 opened. Accordingly, the assist device 121 can be disposed on the side of the workpiece carriage 20. Further, since the assist device 121 supports a sheet 125 as the equipment by the equipment supporting portion 124, an operator 126 can easily mount the heavy article like the sheet 125 on the vehicle body 12.

Figure 30:
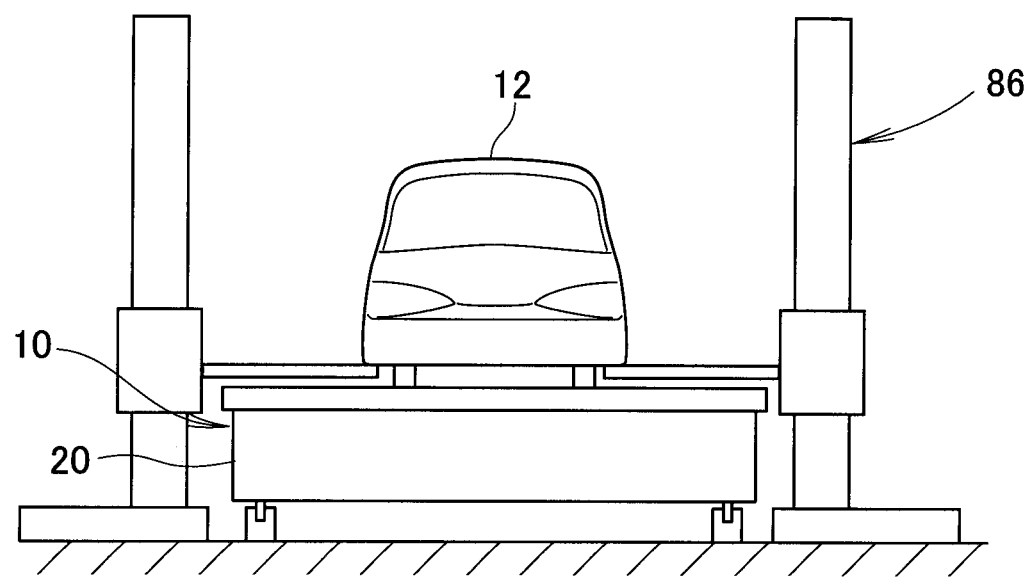
FIG. 30 is a diagram illustrating operation of a lifter.
Figure 31:
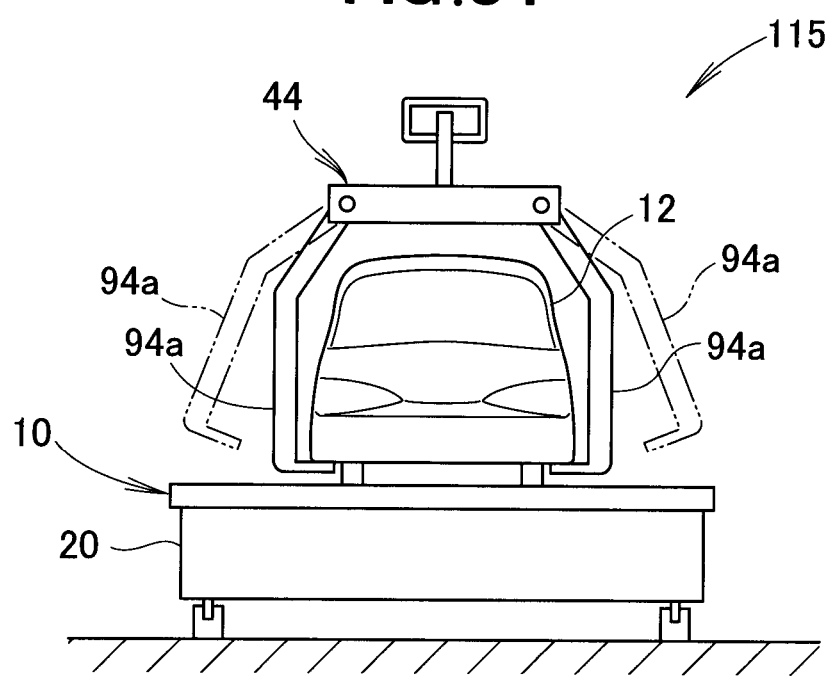
FIG. 31 is a diagram illustrating operation of a hanger.

As illustrated in FIGS. 30 and 31, the conveying carriage unit 10 has the side of the workpiece carriage 20 opened in the vehicle body discharge station 115 (FIG. 28). Therefore, an arm portion 94a of the hanger 94 is carried close to the vehicle body 12 from the side and can support the vehicle body 12. Since the hanger 94 can be used without separating the workpiece carriage 20 from the component carriage 40 (FIG. 28), and man-hours can be reduced, productivity in an entire assembly line can be improved.

Further, the conveying carriage unit 10 has the side of the workpiece carriage 20 opened. Therefore, the second lifter 86 can be disposed on the side of the workpiece carriage 20, and can lift the vehicle body 12. Since the second lifter 86 can be used without separating the workpiece carriage 20 from the component carriage 40 (FIG. 28) and the man-hours can be reduced, productivity in the entire assembly line can be improved.

Figure 32:
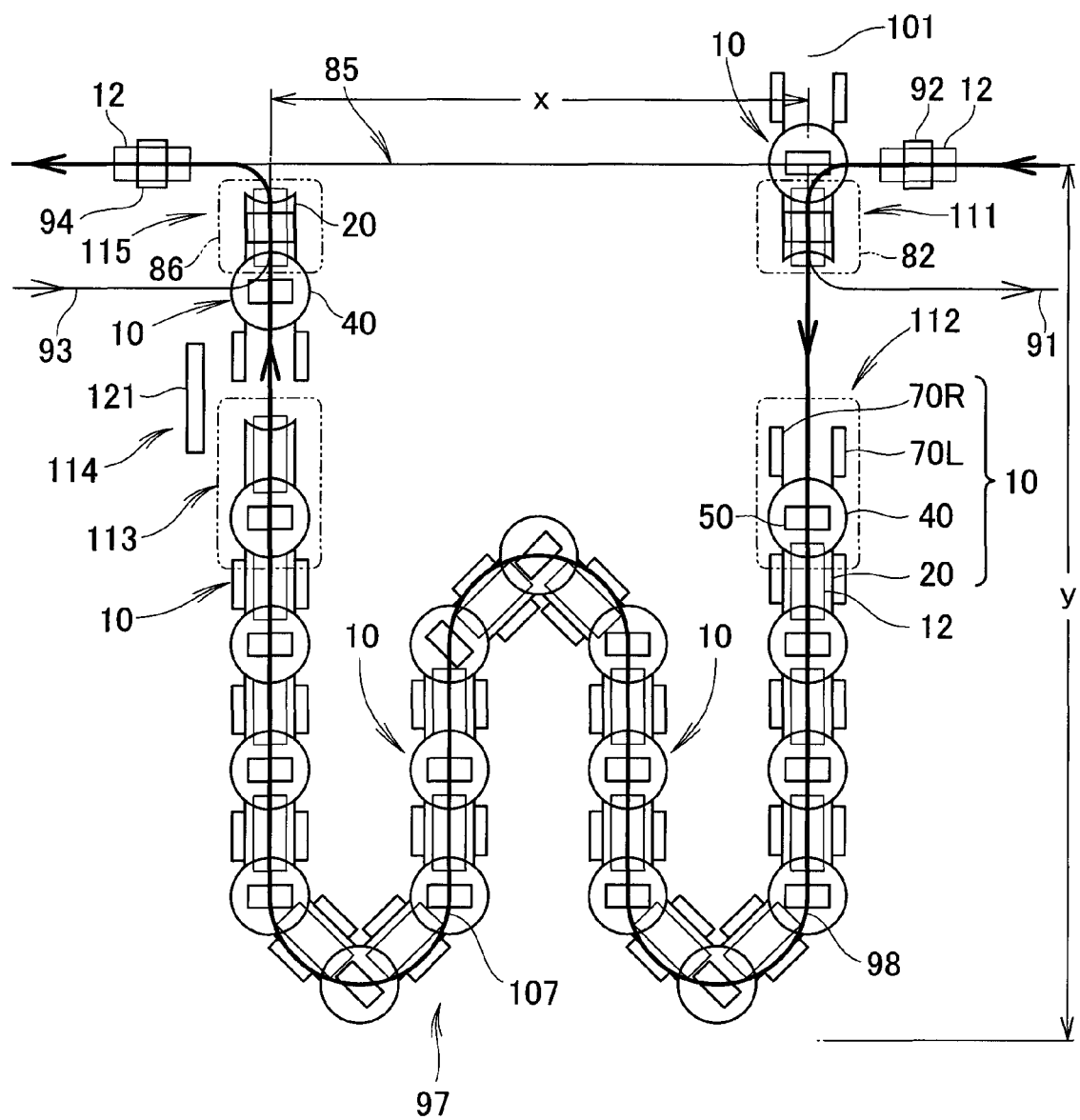
FIG. 32 is a diagram illustrating a modified example of an upstream component mounting work area illustrated in FIG. 28.

Next, a modified example of the component mounting facility 80 according to the second embodiment illustrated in FIG. 27 is illustrated in FIG. 32. As illustrated in FIG. 32, the conveyance passage in the upstream component mounting work area 97 may be W-shaped. By forming the conveyance passage 107 in the W-shape, the larger number of components can be mounted. Further, a projecting length y from the assembly line 85 is shortened although a distance x between the first lifter 82 and the second lifter 86 is elongated. The same shall apply in the downstream component mounting work area 103.

Meanwhile, the workpiece carriage 20 is a self-traveling carriage including the drive source, but may be moved by being hooked on a chain hook that moves in a circulating manner, or may be moved by being pushed by the operator.

Connection and separation between the workpiece carriage 20 and component carriage 40 and connection and separation between the component carriage 40 and sub-component carriages 70L, 70R may be executed by manually inserting or pulling out a pin. More specifically, use of the overhead conveyer 93 is essential in the center component mounting work area 104, but movement of the carriages 20, 40 in the upstream and downstream component mounting work areas 97, 103 may be any one of self-traveling, traveling by external force, and traveling by hand-pushing.

Further, the conveying carriage unit according to the present invention may convey the vehicle body, and also may convey other articles other than the vehicle body. Additionally, the carriage upper floor may be a non-rotational floor laid over the carriage body, and the component housing section may be one housing section without divisions of the first and second component housing sections. Further, the conveying carriage unit is applied in the cell production system according to the embodiment, but not limited thereto, the conveying carriage unit may also be used in a normal production line.

Additionally, according to the embodiment, the sub-component carriages 70L, 70R are hooked on the pins 56 of the side arms 54L, 54R, but not limited thereto, the sub-component carriages 70L, 70R may be connected to pins or the like provided at other portions of the conveying unit as long as the sub-component carriages can be connected to the workpiece carriage 20 or the component carriage 40.

INDUSTRIAL APPLICABILITY

The present invention is suitable for a component mounting line whereby components are mounted on a vehicle body.

REFERENCE SIGNS LIST

10 Conveying carriage unit
12 Mounting target (workpiece, vehicle body)
13 Component
20 Workpiece carriage
22 Floor panel
22a Recessed arc-shaped portion
24L, 24R Work floor
40 Component carriage
41 Carriage body
44 Carriage upper floor (turntable)
44a Work floor
44b Projected arc-shaped portion
46 Component housing section (first component housing section)
47 Component housing section (second component housing section)
49 Center shaft of projected arc-shaped portion
50 Component housing section
66 Rotation angle control section
70L, 70R Sub-component carriage
85 Workpiece conveyance passage (assembly line)
93 Overhead conveyer (second overhead conveyer)
97 Upstream component mounting work area
98 U-shape conveyance passage
99 Curved portion
101, 102 Component-only conveyance passage
103 Downstream component mounting work area
104 Center component mounting work area
110 Component station
111 Load station
112 Connect station
113 Connection release station
114 Equipment mount station
116 Collect station
117 Supply station

The invention claimed is:

1. A conveying carriage unit configured to convey components and a workpiece as a mounting target on which the components are mounted, comprising:
    a component carriage configured to convey the components; and
    a workpiece carriage arranged in front or back of the component carriage, connected to the component carriage in a separable manner, and configured to convey the workpiece,
wherein the component carriage includes a carriage body, a carriage upper floor mounted on the carriage body and configured such that an operator can ride, and a component housing section provided at the carriage upper floor and configured to house the components,
    the workpiece carriage includes a work floor on which the operator rides, and
    the conveying carriage unit is connected to preceding and following conveying carriage units in a turnable manner.

2. The conveying carriage unit according to claim 1, wherein
    the component housing section includes a first component housing section configured to house components to be mounted on the workpiece, and a second component housing section disposed in front or back of the workpiece and configured to house components to be mounted on the workpiece, and
    the carriage upper floor is a turntable supported by the carriage body in a rotatable manner, and rotation of the turntable is controlled by a rotation angle control section such that a distance from the first component housing section to the workpiece becomes substantially equal to a distance from the second component housing section to the workpiece disposed in front or back.

3. The conveying carriage unit according to claim 1, wherein the workpiece carriage is disposed in back of the component carriage, and right and left sub-component carriages are additionally connected to the component carriage, having the left sub-component carriage disposed on a left side of the workpiece carriage and the right sub-component carriage disposed on a right side of the workpiece carriage.

4. The conveying carriage unit according to claim 1, wherein the workpiece carriage is disposed in back of the component carriage, and right and left sub-component carriages are additionally connected to the component carriage, having the left sub-component carriage disposed on a left side of the workpiece carriage and the right sub-component carriage disposed on a right side of the workpiece carriage.

5. A component conveying system in which a floor panel having both ends recessed arc-shaped and configured to load a workpiece, and a carriage upper floor having both ends projected arc-shaped and configured to load a component to be mounted on the workpiece are arranged such that the projected arc-shaped portion is fitted into the recessed arc-shaped portion, the floor panel is connected to the carriage upper floor in a separable and rotatable manner around a center shaft of the projected arc-shaped portion of the carriage upper floor and also configured to be conveyed continuously, the system comprising:
   a U-shape conveyance passage disposed at a conveyance passage for the workpiece and configured to guide the floor panel and the carriage upper floor mutually connected via at least one curved portion;
   a connect station disposed at an upstream side end portion of the U-shape conveyance passage and configured to connect the floor panel to the carriage upper floor;
   a release station disposed at a downstream side end portion of the U-shape conveyance passage and configured to release connection of the floor panel from the carriage upper floor; and
   a component station configured to bring in the carriage upper floor released at the release station, fill the carriage upper floor with the components, and send out the carriage upper floor to the connect station.

6. The component conveying system according to claim 5, further comprising:
   a load station whereby the workpiece is loaded on the floor panel before the floor panel reaches the connect station; and
   an unload station whereby the workpiece is unloaded from the floor panel after the floor panel has passed the release station,
   wherein the floor panel is conveyed from the unload station to the load station in a circulating manner.

7. The component conveying system according to claim 6, wherein
   the component station includes a collect station configured to collect an emptied component housing section from the carriage upper floor after the carriage upper floor has passed the release station, and a supply station configured to supply the carriage upper floor with the component housing section filled with the components before the carriage upper floor reaches the connect station, and
   the carriage upper floor is conveyed from the collect station to the supply station in a circulating manner.

8. The component conveying system according to claim 5, wherein
   the component station includes a collect station configured to collect an emptied component housing section from the carriage upper floor after the carriage upper floor has passed the release station, and a supply station configured to supply the carriage upper floor with the component housing section filled with the components before the carriage upper floor reaches the connect station, and
   the carriage upper floor is conveyed from the collect station to the supply station in a circulating manner.

9. A conveying carriage unit configured to convey components and a workpiece as a mounting target on which the components are mounted, comprising:
   a workpiece carriage configured to convey the workpiece;
   a component carriage disposed adjacent to the workpiece carriage and configured to convey a part of the components; and
   right and left sub-component carriages pulled by the component carriage or the workpiece carriage and configured to convey a remaining part of the components,
wherein the workpiece carriage includes a work floor on which an operator rides,
   the component carriage includes a carriage body, a carriage upper floor mounted on the carriage body, and a component housing section disposed on the carriage upper floor and configured to house a part of the components,
   the right and left sub-component carriages are disposed on the sides of a workpiece carriage of a following conveying carriage unit, and
   the conveying carriage unit is connected to preceding and following conveying carriage units in a turnable manner.

10. The conveying carriage unit according to claim 9, wherein
   the component housing section includes a first component housing section configured to house components to be mounted on the workpiece, and a second component housing section configured to house components to be mounted on a workpiece disposed in back of the workpiece,
   the carriage upper floor is a turntable supported by the carriage body in a rotatable manner, and
   rotation of the turntable is controlled by a rotation angle control section such that a distance from the first component housing section to the workpiece becomes substantially equal to a distance from the second component housing section to the workpiece disposed in back.

11. A component conveying system using the conveying carriage unit according to claim 10, comprising:
   a connection release station disposed on a workpiece conveyance passage and configured to release connection between preceding and following conveying carriage units; and
   an equipment mounting station whereby equipment is mounted on the workpiece from a side on the following conveying carriage unit when the preceding conveying carriage unit moves forward and the following conveying carriage unit has the side of the workpiece carriage opened.

12. A component conveying system using the conveying carriage unit according to claim 9, comprising:
   a connection release station disposed on a workpiece conveyance passage and configured to release connection between preceding and following conveying carriage units; and
   an equipment mounting station whereby equipment is mounted on the workpiece from a side on the following conveying carriage unit when the preceding conveying carriage unit moves forward and the following conveying carriage unit has the side of the workpiece carriage opened.

* * * * *